US009831992B2

(12) United States Patent
Haghighat et al.

(10) Patent No.: US 9,831,992 B2
(45) Date of Patent: Nov. 28, 2017

(54) SYSTEMS AND/OR METHODS FOR MANAGING OR IMPROVING INTERFERENCE BETWEEN CELLS

(71) Applicant: INTERDIGITAL PATENT HOLDINGS, INC., Wilmington, DE (US)

(72) Inventors: Afshin Haghighat, Ile-Bizard (CA); J. Patrick Tooher, Montreal (CA); Paul Marinier, Brossard (CA); Diana Pani, Montreal (CA); Lujing Cai, Morganville, NJ (US); Shahrokh Nayeb Nazar, San Diego, CA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 14/995,721

(22) Filed: Jan. 14, 2016

(65) Prior Publication Data

US 2016/0127089 A1  May 5, 2016

Related U.S. Application Data

(63) Continuation of application No. 13/751,111, filed on Jan. 27, 2013, now Pat. No. 9,271,168.
(Continued)

(51) Int. Cl.
*H04W 4/00* (2009.01)
*H04L 5/00* (2006.01)
(Continued)

(52) U.S. Cl.
CPC .............. *H04L 5/0032* (2013.01); *H04L 5/00* (2013.01); *H04L 5/0035* (2013.01);
(Continued)

(58) Field of Classification Search
None
See application file for complete search history.

(56) References Cited

U.S. PATENT DOCUMENTS 8,917,644 B2  12/2014  Maeda et al.
2006/0223443 A1  10/2006  Reudink
(Continued)

FOREIGN PATENT DOCUMENTS

CN  101208966 A  6/2008
CN  101541012 A  9/2009
(Continued)

OTHER PUBLICATIONS

3rd Generation Partnership Project (3GPP), R1-102307, "Interference Coordination for Non-CA-based Heterogeneous Networks", NTT DoCoMo, 3GPP TSG RAN WG1 Meeting #60bis, Beijing, China, Apr. 12-16, 2010, 11 pages.
(Continued)

*Primary Examiner* — Kibrom T Hailu
(74) *Attorney, Agent, or Firm* — Condo Roccia Koptiw LLP

(57) ABSTRACT

Systems and methods for managing and/or improving interference in cells may be provided. For example, in embodiments, a partial-band Almost Blank Subframe (PB-ABS) subframe and/or a spatial Almost Blank Subframe (SABS) may be provided and/or used for coordinating communication with in networks with smaller and larger cells (e.g. pico or macro cells). For example, a PB-ABS may provide a dimension (e.g. frequency) that may be used to define a region and/or particular resources (e.g. resource blocks) reserved for pico cell operations or transmissions and a region or other resources (e.g. not those reserved for pico cell operations) available for macro cell operations or transmissions. Additionally, based on beam parameters (e.g. associated with cell partitioning), SABS may offer an addi-
(Continued)

tional dimension (e.g. spatial) that may be used to prevent transmission in a particular spatial direction.

12 Claims, 24 Drawing Sheets

Related U.S. Application Data

(60) Provisional application No. 61/591,605, filed on Jan. 27, 2012, provisional application No. 61/653,176, filed on May 30, 2012.

(51) Int. Cl.
  *H04W 24/02* (2009.01)
  *H04W 72/12* (2009.01)
  *H04W 16/32* (2009.01)
  *H04W 16/28* (2009.01)
  *H04W 16/30* (2009.01)

(52) U.S. Cl.
  CPC ........... *H04L 5/0073* (2013.01); *H04W 24/02* (2013.01); *H04W 72/1289* (2013.01); *H04L 5/0007* (2013.01); *H04L 5/0044* (2013.01); *H04W 16/28* (2013.01); *H04W 16/30* (2013.01); *H04W 16/32* (2013.01)

(56) References Cited

U.S. PATENT DOCUMENTS

| 2010/0222062 A1 | 9/2010 | Chou et al. | |
|---|---|---|---|
| 2010/0222070 A1* | 9/2010 | Yun | H01Q 21/28 455/452.2 |
| 2012/0014333 A1 | 1/2012 | Ji et al. | |
| 2012/0082052 A1* | 4/2012 | Oteri | H04W 24/10 370/252 |
| 2012/0231790 A1* | 9/2012 | Lindoff | H04W 48/16 455/434 |
| 2013/0084865 A1 | 4/2013 | Agrawal et al. | |
| 2013/0188594 A1 | 7/2013 | Cesar et al. | |
| 2013/0250927 A1 | 9/2013 | Song et al. | |

FOREIGN PATENT DOCUMENTS

| EP | 2262330 A1 | 12/2010 | |
|---|---|---|---|
| JP | 2013-526154 A | 6/2013 | |
| SE | WO 2012052066 A1 * | 4/2012 | ............ H04W 16/28 |
| WO | WO 2011/047348 A1 | 4/2011 | |
| WO | WO 2011/118993 A2 | 9/2011 | |
| WO | WO 2011/130447 A1 | 10/2011 | |

OTHER PUBLICATIONS

3$^{rd}$ Generation Partnership Project (3GPP), TS 36.331 V9.10.0, "3$^{rd}$ Generation Partnership Project; Technical Specification Group Radio Access Network; Evolved Universal Terrestrial Radio Access (E-UTRA); Radio Resource Control (RRC); Protocol Specification (Release 9)", Mar. 2012, 255 pages.

3$^{rd}$ Generation Partnership Project (3GPP), TW 36.423 V10.5.0, 3$^{rd}$ Generation Partnership Project, Technical Specification Group Radio Access Network; Evolved Universal Terrestrial Radio Access Network (E_UTRAN); X2 application protocol (X2AP) (Release 10), Mar. 2012, 132 pages.

3$^{rd}$ Generation Partnership Project (3GPP), R4-115012, "AAS possible application scenarios", Huawei, 3GPP TSG-RAN WG4 Meeting # 60 bis, Zhuhai, China, Oct. 10-14, 2011, 2 pages.

3$^{rd}$ Generation Partnership Project (3GPP), RP-111349, "New SI: Study of RF and EMC Requirements for Active Antenna Array System (AAS) Base Station", Huawei, 3GPP TSG-RAN, Meeting # 53, Fukuoka, Japan, Sep. 12-16, 2011, 5 pages.

3$^{rd}$ Generation Partnership Project (3GPP), TS 36.331 V10.5.0, "3$^{rd}$ Generation Partnership Project; Technical Specification Group Radio Access Network; Evolved Universal Terrestrial Radio Access (E-UTRA); Radio Resource Control (RRC); Protocol specification (Release 10)", Mar. 2012, 302 pages.

\* cited by examiner

SYSTEMS AND/OR METHODS FOR MANAGING OR IMPROVING INTERFERENCE BETWEEN CELLS

CROSS-REFERENCE TO RELATED APPLICATIONS

This application is a continuation of U.S. patent application Ser. No. 13/751,111, filed Jan. 27, 2013, which claims the benefit of U.S. Provisional Patent Application Nos. 61/591,605 filed Jan. 27, 2012, and 61/653,176 filed May 30, 2012, the contents of which are hereby incorporated by reference herein.

BACKGROUND

Global mobile data traffic has increased each year since 2008 and it is projected to continue to increase as more and more users purchase or obtain mobile devices that use mobile networks. To address this growth, the networks and operators thereof may need and/or may use additional spectrum. However, spectrum is finite, scarce, and expensive. Additionally, current macro-based and/or small-cell network deployments (e.g. Long Term Evolution (LTE) or LTE-Advanced (LTE-A) deployments) may be insufficient, may be inefficient, and/or may not deliver desired performance. For example, in macro-based and/or small-based network deployments, current Almost Blank Subframes (ABS) techniques may be used to create a time division multiplexing (TDM) framework for interference-free operation of macro and pico cells. While current ABS techniques may improve the average cell throughput of macro and pico cells collectively, such ABS techniques may reduce the average throughput of the macro UEs (e.g. there may be instances where resources may be taken away from macro cell operations in an ABS subframe due to the pico cell). Additionally, in macro-based and/or small-based network deployments, interference conditions, backhaul, and/or operation of the cells associated therewith may need to be managed to control deployment costs, expenditures, capacity, efficiency, and the like.

SUMMARY

Systems and/or methods for managing and/or improving interference between cells (e.g. different cells such as smaller cells including pico-cells and larger cells including macro-cells) may be provided. For example, a partial-band Almost Blank Subframe (PB-ABS) subframe may be received and/or determined (e.g. by a base station, UE, and/or cell). The PB-ABS may include a region reserved for smaller cell operations and a region available for larger cell (e.g. macro-cell) operations. An indication of how resource blocks (e.g. almost resource blocks) in a PB-ABS subframe may be allocated for smaller cell operations and/or larger cell operations may be received. In an embodiment, the indication may include a bitmap, in which each bit may represent a resource block or a set of resource blocks and/or parameters associated with the PB-ABS region. The PB-ABS subframe based on the resource allocation indicated such that transmissions may be provided (e.g. signals may be transmitted) to smaller-cell and/or larger-cell UEs based thereon.

Additionally, systems (e.g. a base station and/or user equipment (UE)) and/or methods for cell partitioning may be provided (e.g. to manage and/or improve interference and other characteristics of a system). For example, a base station may partition a cell into one or more sub-cells based on one or more parameters including radiation related parameters such as an elevation angel, an azimuth angle, a beamwidth, or a polarization and/or additional parameters such as a titling angle, a beamwidth, a nulling direction, or a beam transmit power. The base station also generate cell-specific reference symbols associated with the partitioned cell and sub-cells such that the base station may communication with a UE in a sub-cell associated of the cell based on the cell-specific reference symbols. Additionally, the base station may partition one or more resources associated with a sub-cell (e.g. when the sub-cell may cause interference to other sub-cells partitioned from the cell for the UE at a beam edge). The resources may be partitioned by blanking a beam (e.g. beam blanking). In one embodiment, a beam may be blanked by steering the beam away from a particular spatial direction for a particular period of time (e.g. a blank period) that may be defined by a subframe such as a spatial almost blank subframe).

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
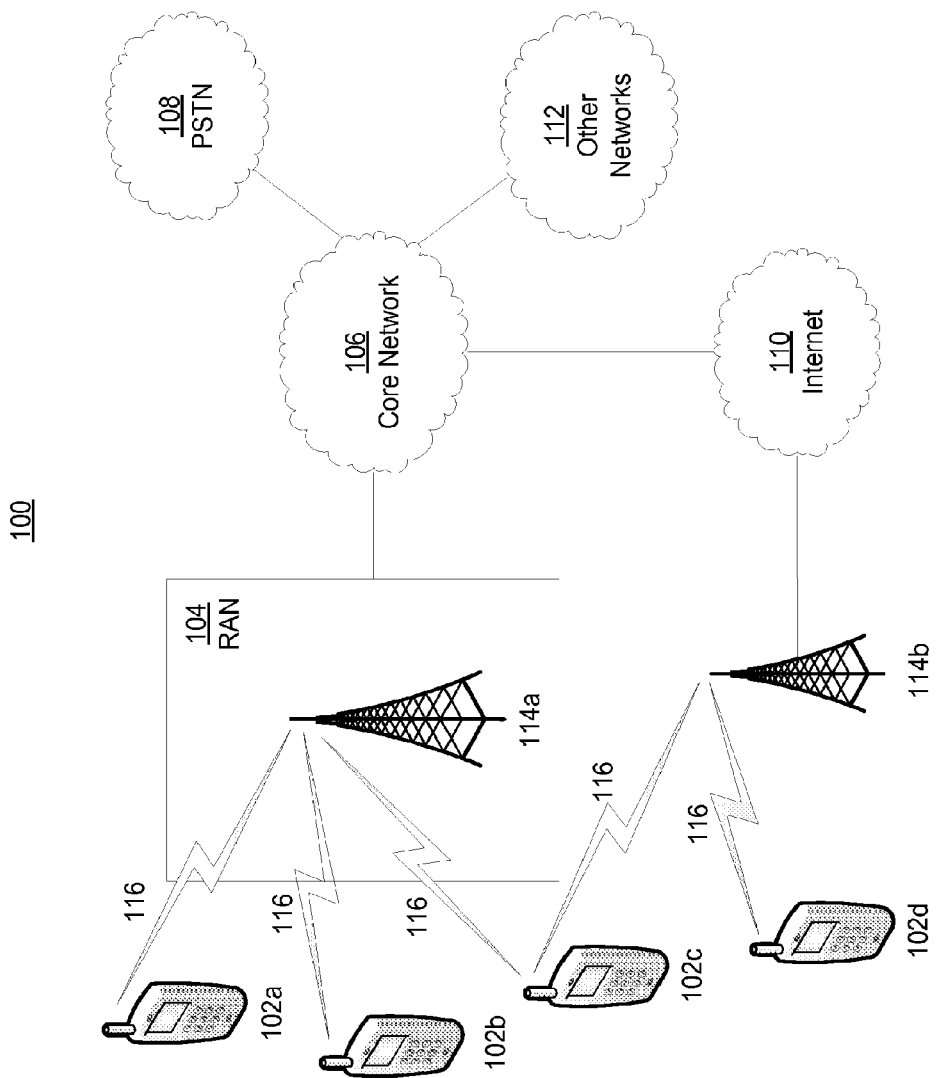
FIG. 1A depicts a diagram of an example communications system in which one or more disclosed embodiments may be implemented.

FIG. 1A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
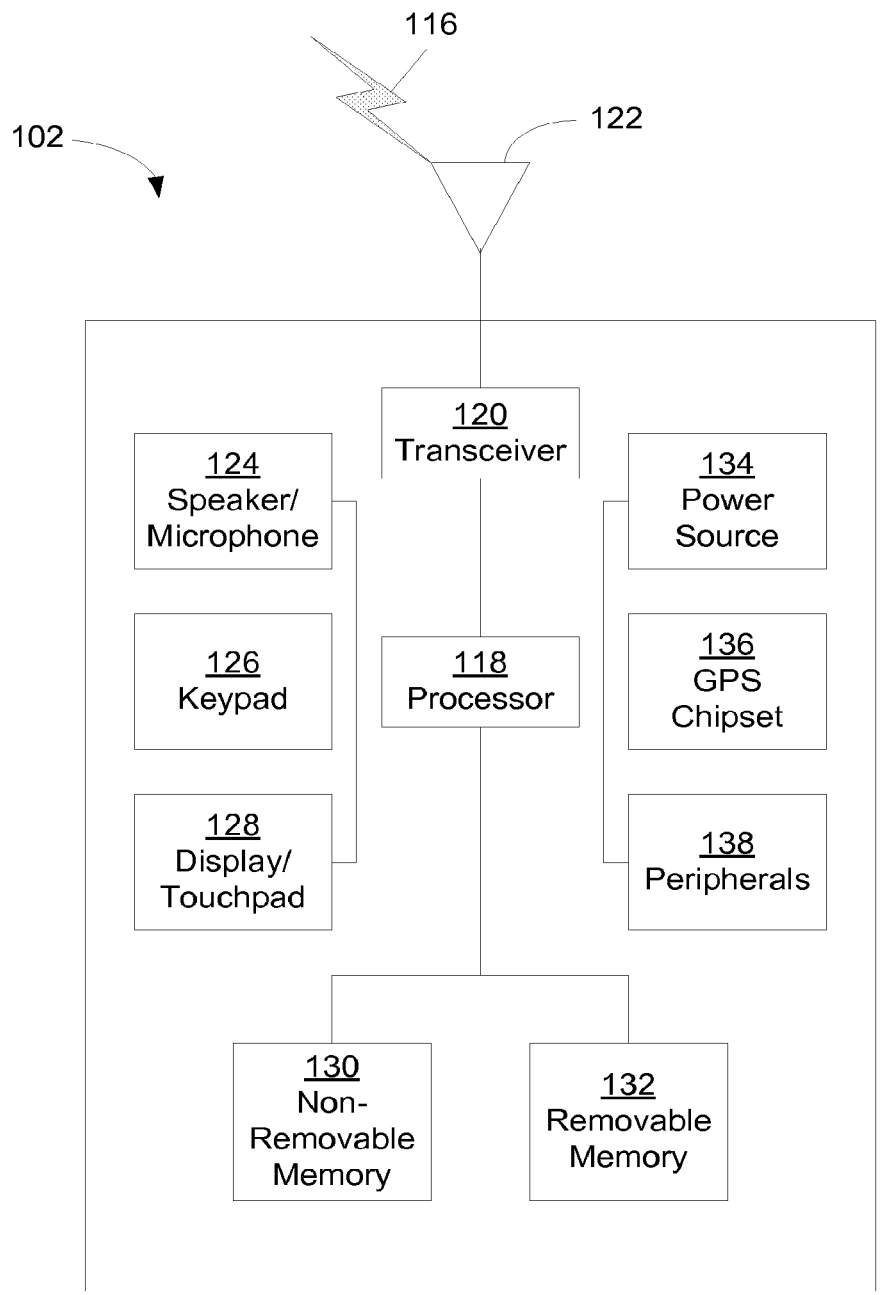
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
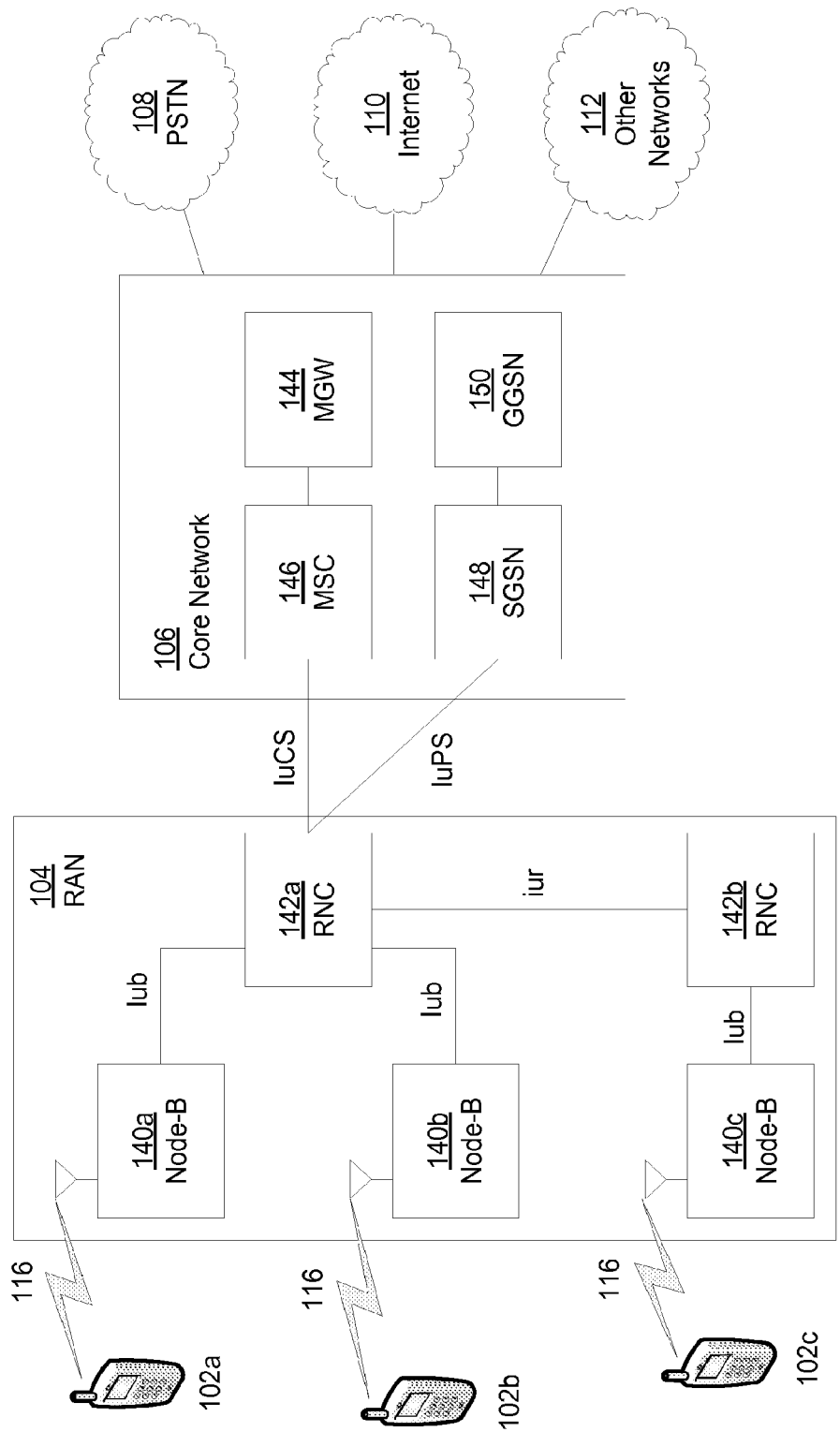
FIG. 1C depicts a system diagram of an example radio access network and an example core network that may be used within the communications system illustrated in FIG. 1A.

FIG. 1C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 1C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
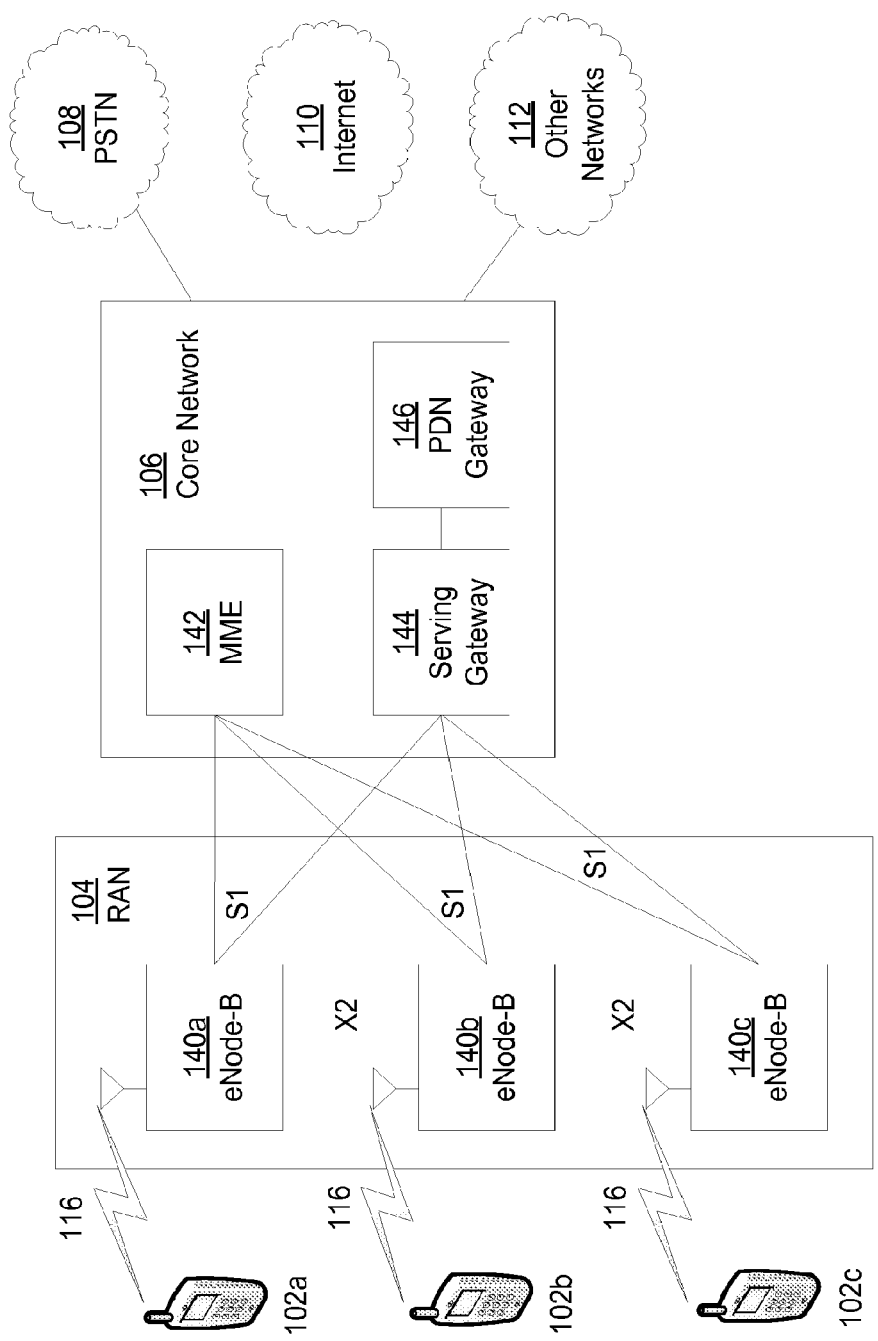
FIG. 1D depicts a system diagram of another example radio access network and an example core network that may be used within the communications system illustrated in FIG. 1A.

FIG. 1D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 1E:
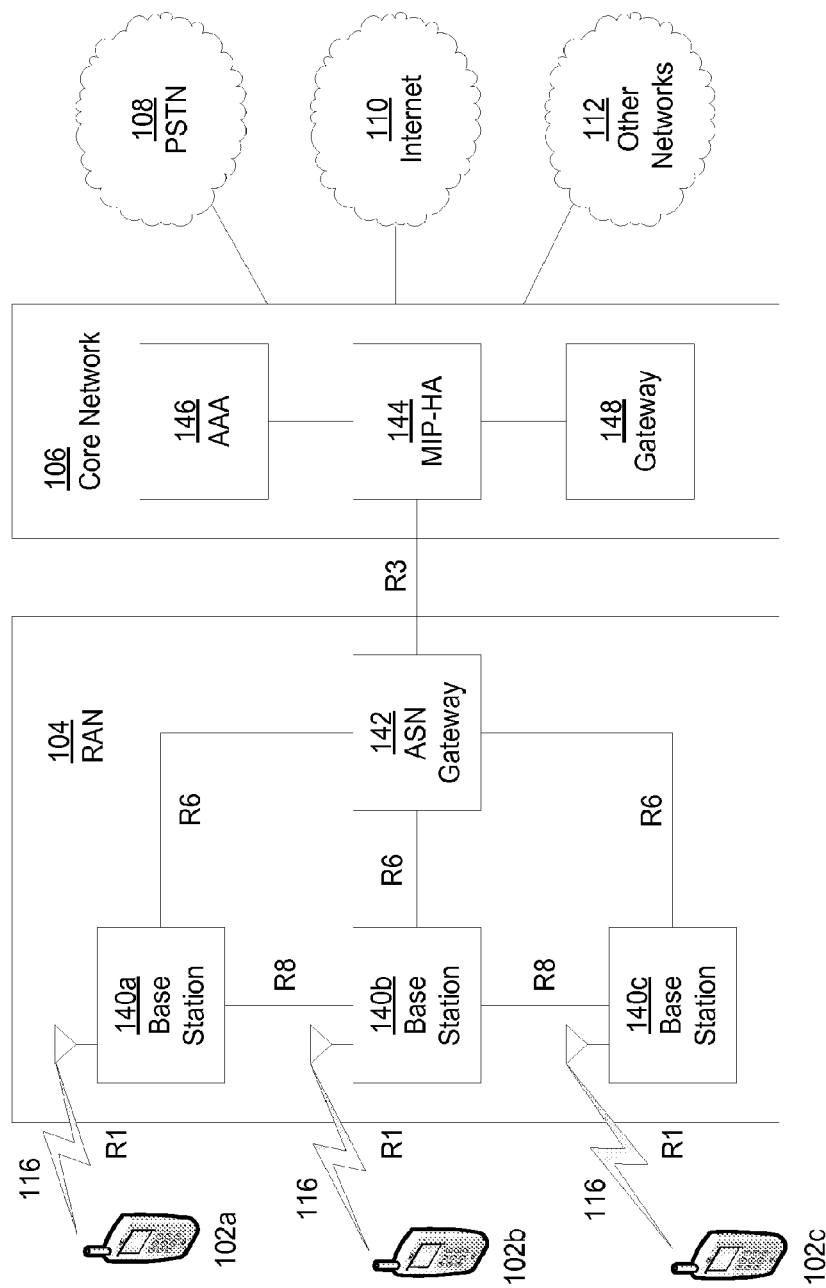
FIG. 1E depicts a system diagram of another example radio access network and an example core network that may be used within the communications system illustrated in FIG. 1A.

FIG. 1E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 1E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Figure 2:
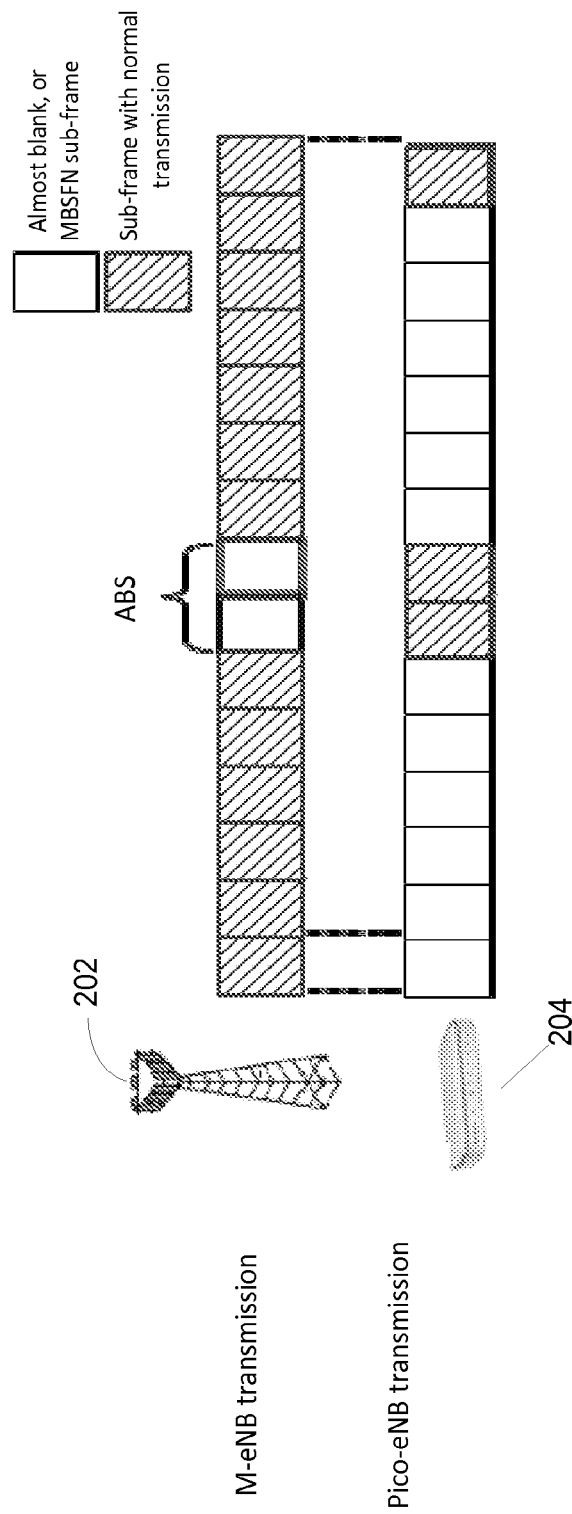
FIG. 2 shows example operation of the Almost Blank Subframes (ABS) mechanism.

As described herein, to help support the increasing data traffic on mobile networks an infrastructure overhaul to existing macro-cell eNBs may be provided and/or used such that a heterogeneous network (het-net) may be established to offload users from macro-cells to small or pico-cells (e.g. that may enable a higher quality of service to users with otherwise poor coverage). To provide protection for such a network, Long Term Evolution Advanced (LTE-A) Enhanced Inter cell Interference Coordination (eICIC) may provide and/or may be used for macro and/or pico (or other small-cell) user equipment (UE). In particular, an Almost Blank Subframes (ABS) mechanism and/or technique may be used to, for example, create a time division multiplexing (TDM) framework to reduce interference (e.g. for an interference-free operation) of macro and/or pico (or other small) cells. FIG. 2 shows an example embodiment of a typical ABS mechanism or technique that may be used, for example, in a macro-based network (e.g. that may be used with the communication system and/or WTRU described above in FIGS. 1A-1E). As shown in FIG. 2, in an ABS subframe, a macro eNB (e.g. 202) may be periodically turned off to allow or enable a pico eNB (e.g. 204) to communicate with its cell-edge UEs. In an example embodiment (e.g. as shown), periodic ABS patterns may be configured semi-statically. Additionally, a periodic ABS pattern may be defined and represented using a 40 bit length mapping. A duty-cycle of an ABS pattern may also be selected such that target load-balancing may be achieved between the Macro and Pico cells. In an embodiment, an ABS subframe may not be entirely blank and may transmit signals to support the operation of legacy UEs (e.g. release 8 UEs). For example, in an ABS subframe, the macro cell may continue transmission of Common Reference Signals (CRS), Primary Secondary Synchronization Channels (PSCHs) and Secondary Synchronization Channels (SSCHs), Physical Broadcast Channel (PBCH), and/or Physical Control Channel (PDCCH).

While the ABS mechanism or technique (e.g. as shown in FIG. 2) may result in an improvement in the average cell throughput of the whole system, it may reduce the average throughput of the macro UEs. For example, in a macro cell, Physical Downlink Shared Channel (PDSCH) resources of an ABS subframe may have and/or may operate under constraints such as lowered transmission power to, for example, reduce or limit interference on pico or small-cell UEs. Such resource allocation for the ABS subframes at the macro cells may be performed without knowledge of the actual needs of the pico or small-cell UEs. In such an embodiment, a pico cell may need a fraction of such resources such that there may be instances where more resources are taken away from macro cell operations in an ABS subframe than a pico cell may need.

As such, systems and/or methods for providing an ABS subframe that may be used with or may support such macro and/or pico or small-cell UEs and/or networks associated therewith and interference coordination in such cells, UEs, and/or networks may be disclosed. Such an ABS subframe may include and/or may use one or more additional dimensions in combination with time domain partitioning (TDM) (e.g. a first dimension) that may be used with current ABS subframes, mechanisms, and/or techniques. One such dimension (e.g. an additional dimension) may be a frequency domain (e.g. a second dimension), for example, that may be used to provide or create a Partial-Band (PB) ABS (PB-ABS) subframe and/or detection of such a PB-ABS subframe including, for example, RRM, RLM, and/or CSI measurements resource restriction for PB-ABS, partitioning of PB-ABS subframes in two serving cells, and the like. Another such dimension (e.g. an additional dimension that may be used with TDM and/or the frequency domain) may be a spatial domain (e.g. a third dimension) that may be used to provide or create a Spatial ABS (SABS), resource partitioning with SABS implemented by beam specific parameters, signaling coordinated beam parameters and/or control, beam specific reference signal for sub-cell identification at a UE, beam blanking, and/or UE measurement over blanked beam resources.

Figure 3:
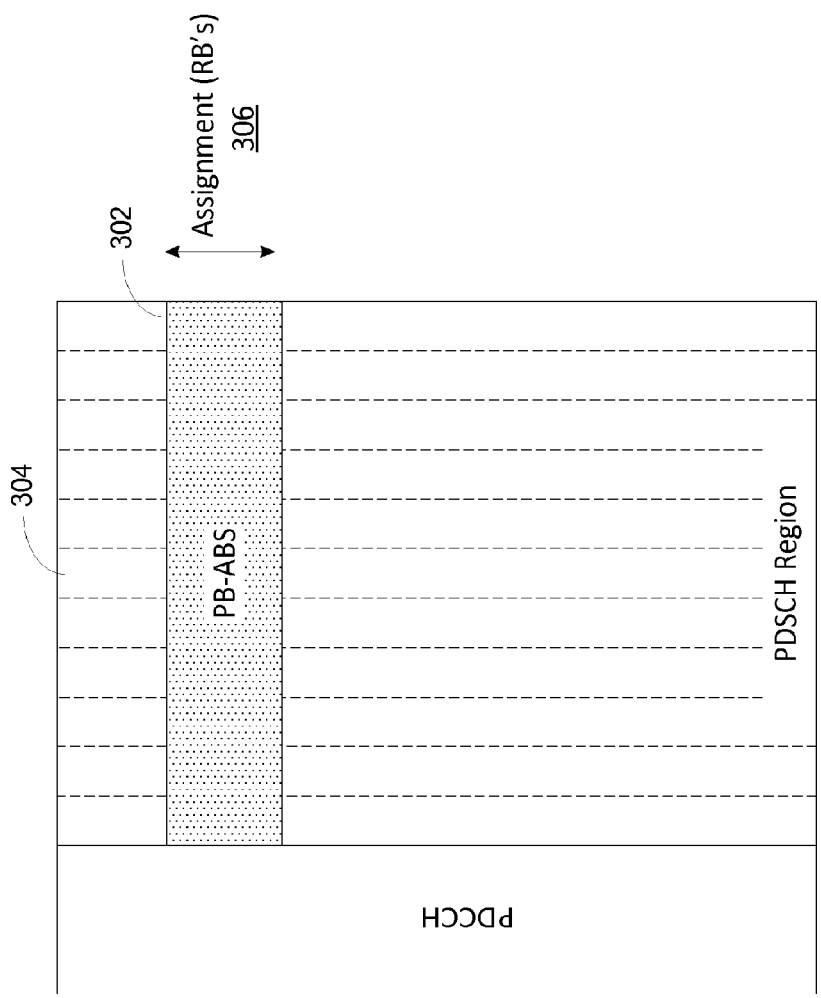
FIG. 3 shows an example partial-band (PB) ABS subframe in non-Multicast-Broadcast Single Frequency Network (non-MBSFN) configuration.
Figure 4:
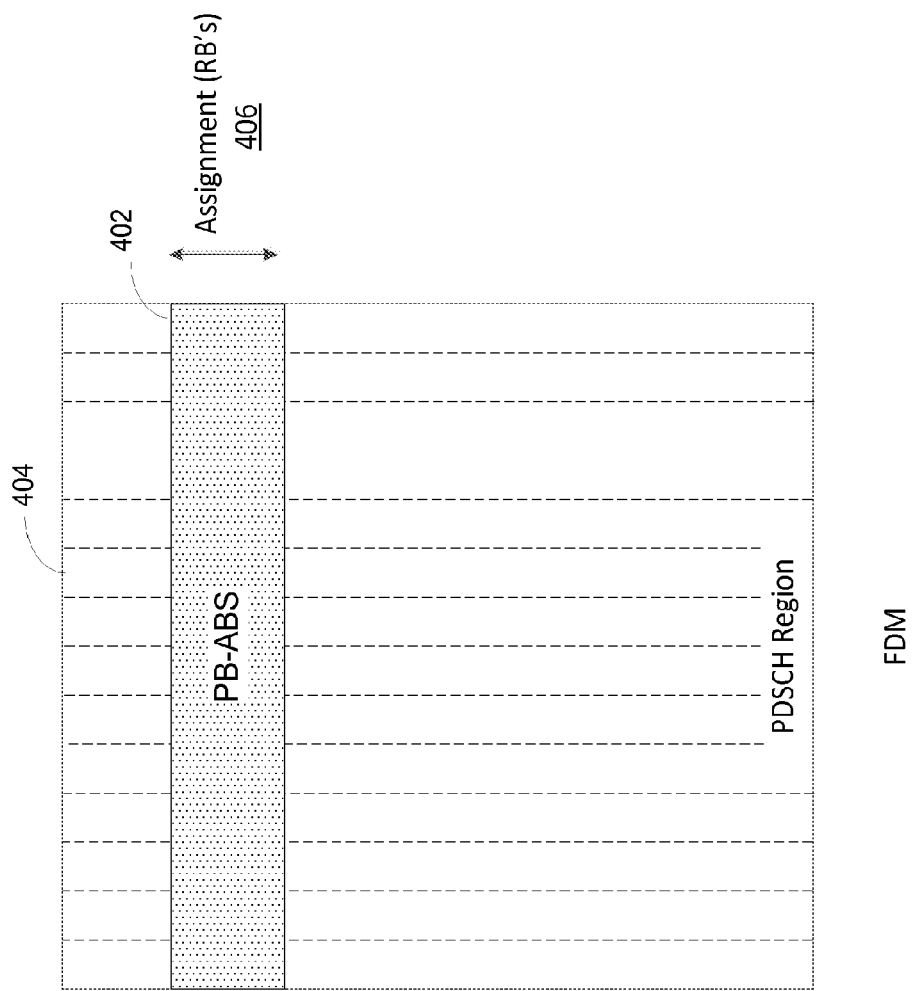
FIG. 4 shows an example PB-ABS subframe in Multicast-Broadcast Single Frequency Network (MBSFN) configuration.

For example, a PB-ABS may be defined, provided, and/or used (e.g. which may include TDM plus a frequency domain such as FDM) to support such macro and/or pico or small-cell UEs and/or networks. FIGS. 3 and 4 illustrate example PB-ABS subframes in non-Multicast-Broadcast Single Frequency Network (MBSFN) and MBSFN configurations respectively. As shown in FIGS. 3 and 4, a PB-ABS subframe may include one or more PB-ABS regions (e.g. 302 and 402) that may be a portion of a PDSCH region (e.g. 304 and 404). The PB-ABS region (e.g. 302 and 402) may be reserved for pico-cell operations or other small-cell operations on the network. For example, the PB-ABS region may include one or more resource blocks (RBs) (e.g. 306 and 406) and/or a subset of the RBs in the PB-ABS subframe where such RBs or a subset thereof may be used for pico-cell or small-cell operations. The PB-ABS subframe and/or ABS subframe may further include one or more regions that may be used for macro-cell operations such that one or more RBs (e.g. those RBs not used for the pico-cell) may be available for macro-cell transmission. As such, a subframe (e.g. the PB-ABS) may be provided and/or received where such a subframe includes a region (e.g. the PB-ABS region) or an indication (e.g. a bitmap as described herein) of an allocation of the region for smaller cell operations such as pico-cell operations and a region (e.g. the ABS region) available for larger cell operations. Such a subframe may be processed such that a determination may be made on where to transmit information or signals. For example, based on the allocation identified or included in the indication, one or more RBs (e.g. almost RBs) and/or one or more parameters (e.g. region parameters) for the region (e.g. PB-ABS region) may be identified and/or used for such small-cell transmissions (e.g. transmissions to small-cell UEs). Based on the allocation in the indication, one or more RBs and/or parameters for the region (e.g. PB-ABS region) that may not be identified and/or used for small-cell transmissions and/or the region available for larger-cell transmissions (e.g. the ABS region) may be used for larger-cell transmissions. Thus, in this embodiment, a macro-cell may transmit to macro UEs in PB-ABS or ABS subframes (e.g. in an ABS band) while limiting or reducing interference on pico UEs. Additionally, the macro-cell may schedule macro UEs in non-PB-ABS subframes without constraints associated with pico UE interference reduction.

As described above, a PB-ABS subframe (e.g. 302 and 402) may include RBs (e.g. 306 and 406) assigned for the PB-ABS region (e.g. which may also be referred as "almost blank RBs" herein). When allocating almost blank RBs, the almost blank RBs may or may not be contiguous. Additionally, the frequency-domain information for the PB-ABS subframe may be defined using a bitmap where each bit may represent an RB or a set of RBs. The number and location of the almost blank RBs in PB-ABS subframes may be fixed, configured semi-statically, and/or dynamically changed. In an embodiment, the PB-ABS region may transmit enhanced-physical downlink control channel (ePDCCH) information. For example, a control channel or control channels related to ePDCCH information that may be mapped outside the legacy control region (e.g. PDCCH shown in FIG. 3) of the subframe may be included in the PB-ABS region.

Additionally, a PDSCH transmission in the PB-ABS region may be muted and/or switched to a Reduced Power (RP) mode such that the macro cell may transmit continuously at a reduced power. In an embodiment, a power offset PRP-ABS for the RP-ABS region (e.g. that may be used to calculate the power or reduced power of the PDSCH transmission in the PB-ABS region) may equal to, or may be derived from, a configured cell range expansion (CRE) value.

Time and/or frequency (e.g. the first and second dimensions) may be used to determine whether an RB may be an almost blank RB. For example, a UE may determine whether an RB may be an almost blank RB using a function of time and/or frequency. In such an embodiment, an almost blank RB may use and/or be represented by a periodicity and time offset and the bands where an almost blank RB may occur may use and/or may be represented by another (e.g. different) periodicity and frequency offset that may be dependent or independent therefrom. Such periodicities, time offsets, and/or frequency offsets (e.g. the periodicity and time offsets of the almost blank RB and the periodicity and frequency offset of the band) may be used (e.g. by the UE) to identify whether an RB may be an almost blank RB such that if the RB may have the particular periodicity and time offset associated with an almost blank RB and/or the particular periodicity and frequency offset of the band it may be flagged and/or identified as such.

The almost blank RBs may also have and/or may be in multiple configurations. In one or more of those configurations, an almost blank RB may allow for and/or may enable limited power transmission to one or more (e.g. some) UEs that may not interfere (e.g. significantly) with cell-edge pico UEs (e.g. UEs that may be connected to the pico eNB and may be located close or adjacent to a boundary of the coverage area of the pico eNB (e.g. rather than near the center of the coverage area)). Additionally, in one or more of those configurations, an almost blank RB may be configured to not transmit to macro UEs.

In an example embodiment, one or more PB-ABS region parameters and/or mapping information (e.g. frequency domain mapping information) may be determined and/or may be used to determine the PB-ABS region and/or almost blank RB (e.g. associated therewith). For example, a UE may receive an indication of the PB-ABS region in a PB-ABS subframe. The UE may receive the indication of resource allocation for PB-ABS region via the PDCCH, RRC signaling, for example, using a broadcast channel, or a combination thereof. The indication may be signaled to the UE explicitly or implicitly. The indication may include, but not limited to bit flags, codes, one or more parameters, and/or a bitmap.

For example, the PB-ABS region in the frequency domain may be defined, indicated, and/or identified using a bitmap. Each bit of the bitmap may represent one or a set of RBs in the subframe (e.g. the PB-ABS subframe in the PB-ABS region) that may be defined by at least one of the following: a set of physical resource blocks, a set of virtual resource blocks, and/or one or more resource block allocation parameters. In an embodiment, the resource block allocation parameters may include, for example, a type of resource allocation (e.g. localized or distributed) and/or a set of bits indicating a set of physical or virtual resource blocks. Additionally, the bitmap or other indication may provide frequency domain mapping information or information that may indicate the PB-ABS mapping in the frequency domain.

According to an embodiment, the PB-ABS mapping information and/or the parameters may be the same or a subset of the Relative Narrowband Transmit Power Indicator (RNTP). The RNTP may include 1 bit per physical resource block (PRB) in the downlink indicating that the transmitted power on that PRB may exceed a pre-defined threshold. In an embodiment, the PB-ABS mapping information may be included in the ABS Informationelement (IE) in the LOAD INDICATION message from the Macro eNB to the Pico on X2. For example, two bitmap patterns may be provided, for example, one indicating the time pattern and another indicating the band pattern. The UE may determine almost blank RB(s) based on the corresponding time and band indicated in the bitmap patterns.

Additionally, the mapping of almost blank RBs in PB-ABS subframes (e.g. that may be indicated by the mapping information, signaling, bitmaps, and the like) may be performed using one or more of the following. For example, in an example method, RBs allocated for the PB-ABS region (e.g. almost blank RBs) may be mapped to, may include, and/or may be defined by a number of RBs around pre-defined fixed point(s) in the band. Examples of such fixed points may be the center of the carrier, or the band edge. Additionally, according to an example method, almost blank RBs may be mapped to, may include, and/or may be defined by equally-spaced PRBs in the frequency domain.

In another example method, RBs allocated for almost blank RBs may be mapped to, may include, and/or may be defined by a PRB, or PRB-pair that may be indicated with a bitmap. For example, fully flexible resource allocation for PB-ABS may be implemented. The bitmap may indicate one or more PRB(s), or PRB-pair(s) allocated for almost blank RBs. The number of bits for the bitmap may include $2 \times N_{RB(DL)}$ or $N_{RB(DL)}$ according to the minimum resource available for the PB-ABS. The UE may receive the bitmap indicating resource allocation for PB-ABS region via the PDCCH, RRC signaling, for example, using a broadcast channel, or a combination thereof.

Additionally, in an embodiment, the PB-ABS region and/or almost blank RBs may be mapped to, may include, and/or may be defined by resource block groups (RBGs) in the resource allocation that may be indicated with a bitmap. For example, a RBG may be a minimum resource granularity for the PB-ABS region. The bitmap may indicate which RBG(s) are allocated as the PB-ABS region. The number of bits for bitmap may be $\lceil (N_{RB(DL)}/P) \rceil$ or the system bandwidth divided by the size of the RGBs. An example of such system bandwidth and the RGB sized based thereon that may be used to determine the number of bits may be shown in Table 1 below. In an embodiment, the UE may receive the bitmap indicating resource allocation for PB-ABS region via the PDCCH, RRC signaling, for example, using a broadcast channel, or a combination thereof.

TABLE 1

| RBG size according to system bandwidth | |
|---|---|
| System Bandwidth $N_{RB(DL)}$ | RBG Size (P) |
| ≤10 | 1 |
| 11-26 | 2 |
| 27-63 | 3 |
| 64-110 | 4 |

Figure 5:
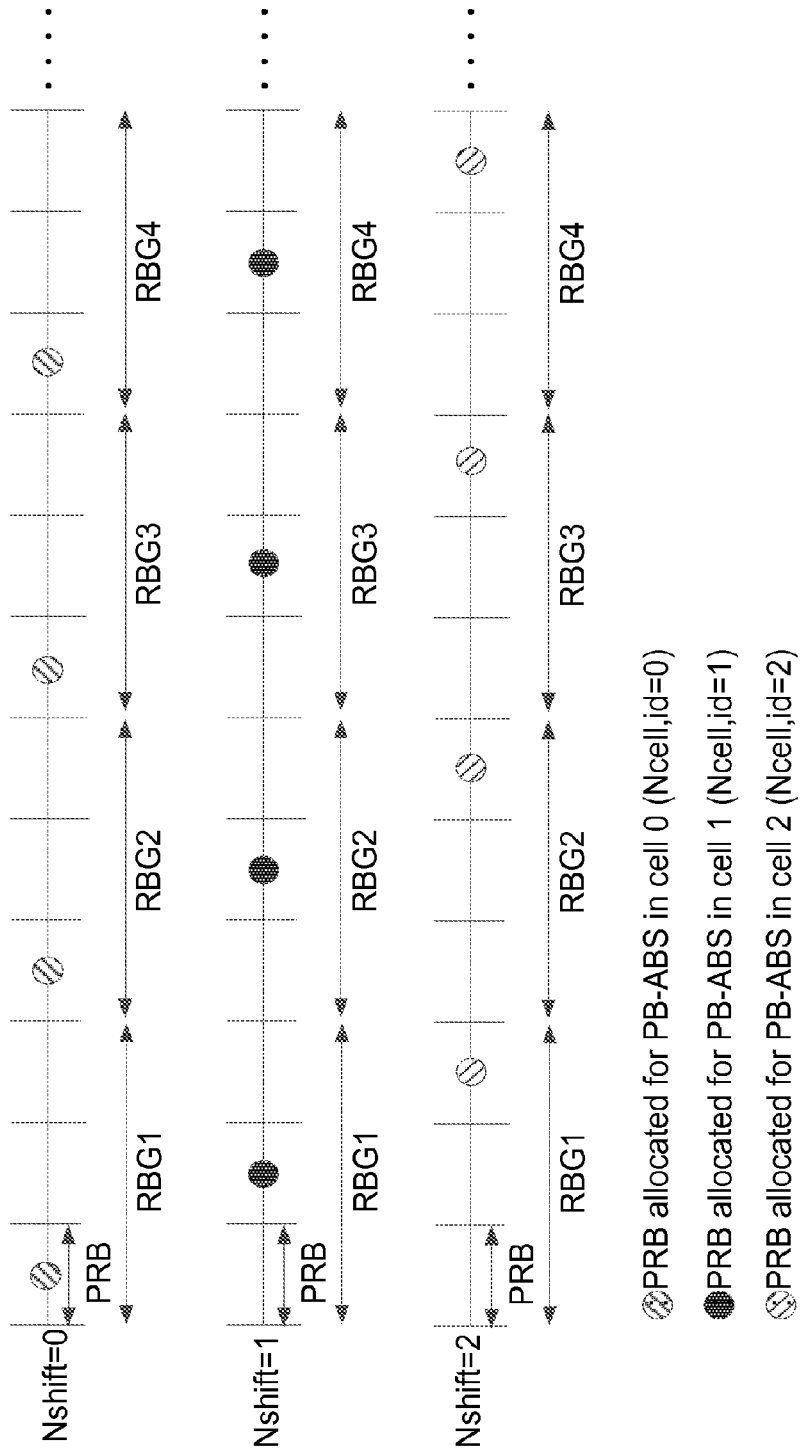
FIG. 5 shows an example PB-ABS resource allocation according to Physical cell Identity (PCI).

In an additional embodiment, allocation for and/or mapping of the PB-ABS region may be pre-defined. For example, a subset of RBG(s) may be used for PB-ABS transmission. The subset may be identified by a PCI (physical cell ID: $N_{cell,id}$) for the serving cell. A single PRB or a PRB pair may be used for PB-ABS for a given cell. Within a subset of RBG(s), the PRB or PRB pair position for a given cell (e.g. that may be used to map or define the PB-ABS) may be identified by PCI. For example, the position of PRB (e.g. that may be used to map or define the PB-ABS) may be defined as $N_{shift}=N_{cell,id}$ mod P. FIG. 5 illustrates example embodiment of PB-ABS resource allocation based on the PCI.

Radio resource measurement (RRM), radio link measurement (RLM) and channel state information (CSI) may be performed, used, and/or provided for during, for example, the PB-ABS subframes described herein. For example, when in PB-ABS mode, a UE using a zero-power CSI reference signal (CSI-RS) pattern may perform RRM/RLM/CSI measurements over a specified band such as the PB-ABS band and/or may perform simultaneous RRM/RLM/CSI measurements inside and outside the specified band.

Additionally, when the UE operates in reduced power PB-ABS mode, a UE may perform CSI-reference signal (CSI-RS) radio link measurements by including the power offset value (e.g. described above) in such calculations. The power offset PRP-ABS may be applied directly to a measurement and/or a relevant threshold. In reduced power PB-ABS subframes, a PDSCH Energy per Resource Element (EPRE) may also be determined. According to an example embodiment, the EPRE may be determined by applying the power offset PRP-ABS value to the corresponding UE-specific ρB and ρA parameters. The ρB parameter may indicate the ratio of PDSCHEPRE to CRS EPRE for OFDM symbols with a cell-specific reference signal (CRS) and the ρA parameter may indicate the ratio of PDSCHEPRE to CRS EPRE for OFDM symbols without CRS.

For CSI feedback, the network may provide a UE with two-dimensional patterns. The UE may then be configured to feedback CSI for PB-ABS patterns. In an embodiment, the UE may be given multiple bands and/or patterns (e.g. ABS and/or PB-ABS patterns) to provide feedback. In particular, for each band, the UE may provide feedback for both PB-ABS patterns and ABS patterns (e.g. R10 ABS patterns).

A UE may further be configured with RRM measurement resource restriction sets for the primary cell (Pcell) as well as for one or more neighboring cells to perform CSI-RS measurements over almost blank RBs (e.g. "protected RBs"), CSI-RS measurements over non-protected RBs, and/or CSI-RS measurements over the entire band. The RRM measurement resource restriction sets may include two-dimensional representations of RBs for indicating RBs for the appropriate feedback.

According to an example embodiment, the almost blank RBs or sets thereof may be configured and/or mapped between macro and pico or other small-cell UEs. For example, information such as an explicit set of RBs or indicators thereof may be transmitted from the Macro to the Pico cells or eNBs (e.g. via the X2 interface) indicating which RB may be an almost blank RB. In an embodiment, one or more of the almost blank RB patterns may also be preconfigured between macro and pico cells such that the almost blank RB patterns may be configured (e.g. preconfigured) between the macro and pico cells and each cell may then configure its own UEs accordingly. In such an embodiment, the almost blank RB sets may be triggered via an IE in the LOAD INDICATION message. Additionally, in embodiments, the pico (e.g. pico cell or eNB) may indicate to the UE whether the pico may need more or less almost blank RBs. The pico may further indicate the needs for more or less resource in either time or frequency. For example, a pico may deem the time periodicity of Almost Blank RBs to be sufficient, but may use a larger or smaller band where ABS may apply or be used.

Additionally, in an embodiment, PB-ABS subframes may be partitioned between serving cells. For example, when PB-ABS may be configured, the UE may operate as though the PB-ABS region and the regions available for macro-cell operations belong to distinct serving cells. In such an embodiment, the protected and unprotected portions of the ABS may be defined as distinct serving cells that may be used to provide communication to the PB-ABS region and/or the macro-cell operations.

Such serving cells that may be included protected and unprotect portions of the ABS may be operated as described herein. For example, in an embodiment, a downlink control channel (e.g. PDCCH or ePDCCH) may be transmitted from at least one of the portions (e.g. protected and/or unprotected) of the ABS. When PDCCH may be transmitted, the mapping (e.g. the location of the PB-ABS across the frequency band) to a resource element group (REG) may be calculated or determined as if the portion of the carrier or subset of RBs may constitute or include a complete carrier and the definition of REG may be applied (e.g. upon determination of the definition of the REG including the mapping or location, the definition may be used by a UE to locate the part of the band associated with PB-ABS). Additionally, in an embodiment, a PDSCH of the protected and non-protected portion may be assigned from the downlink control channel associated with those particular portions. In such an embodiment, cross scheduling may not be used (e.g. may not be allowed). Additionally, cross-scheduling may be used where such cross-scheduling between portions (e.g. protected and/or unprotected) of the bands may be performed via a carrier indication field (CIF). PRB within each band may be numbered such that RBs (e.g. only RBs in an embodiment) that may be part of the band may be counted. For example, within a band, the PRBs may be re-indexed (or re-numbered) such that, in an embodiment, the first PRB of the band may have an index 0 and the last PRB may have an index N−1 where N may be the number of PRBs in the band. In such an embodiment (e.g. for LTE), the PRB indexing scheme may be used in a "frequency allocation" that may be signalled as part of a PDSCH assignment in the downlink control information (DCI). Additionally, such a re-indexing may potentially enable or allow the use of a smaller frequency allocation field in the control signalling if, for example, a "cross-scheduling" assignment may indicate a specific band.

To report CSI, CSI-RS, CRS, and the like that may be measured during the PB-ABS subframes for both portions (e.g. protected and/or unprotected), periodic CSI reporting (e.g. measured during or at PB-ABS) for each portion of the band (e.g. that may be associated with PB-ABS and/or almost blank RBs) may be used such that the CSI, CSI-RS, CRS, and the like may be reported or transmitted with different periods and offsets. Additionally, aperiodic CSI reports for such portions that may be measured during PB-ABS may be triggered separately for each band or for both bands, for example, based on the value of the CSI request field. RRM measurements may also be defined separately for such portions of the band.

As described above, a spatial domain may also be provided and/or used (e.g. in addition to a time domain TDM of ABS and frequency domain of PB-ABS, example) to define and/or provide a spatial almost blank subframe (SABS) that may be used to support macro and/or pico or small-cell UEs and/or networks and interference coordination associated therewith. For example, cell densification in a dense and small cell deployment may be provided and/or used. In such an embodiment, cell partitioning may be performed via narrow beams formed by an active array system (AAS) and signaling may be used to coordinate beam parameters for different cell deployments that may be dynamically or semi-statically configured. Based on the beam specific parameters, Spatial Almost Blank Subframes (SABS) may be provided and/or used as an additional dimension for the interference coordination and/or management. Additionally, (e.g. for interference coordination associated with AAS based beamforming), coordinated beam blanking and related UE measurements may be provided and/or used.

For example, as described above, an Active Antenna System (AAS) may be provided and/or used. Such an ASS may integrate completed RF transceivers into each antenna element included therein where each element may be fed with a digital RF stream. In an embodiment, a number of these elements may be arranged into certain geometry to form an antenna array. Additionally, by independently controlling phase and/or amplitude of each antenna element in the array, an antenna beam pattern associated therewith may be electrically steered. According to an example embodiment, the AAS may have a large geometry forming the antenna array with a large number of antenna elements. Such an embodiment may provide narrow radiation beams. Application of AAS to a base station (e.g. a 3GPP base station) may further boost network capacity and user coverage of a wireless network (e.g. such as the network described above in FIGS. 1A-1E).

Figure 6:
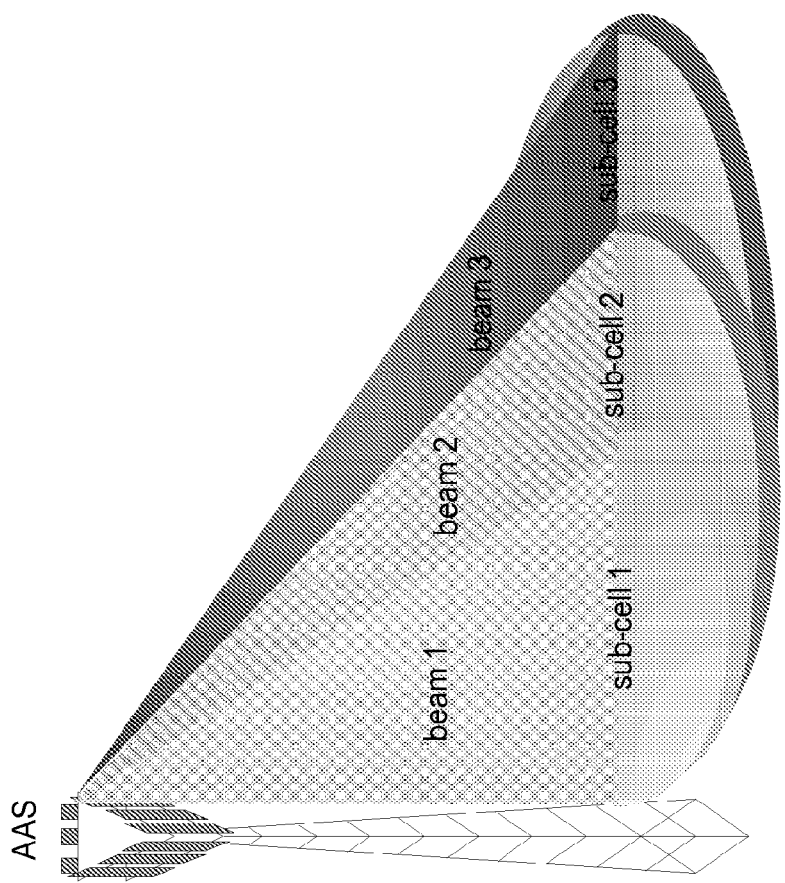
FIG. 6 illustrates an example embodiment of cell partitioning by vertical beamforming.
Figure 7:
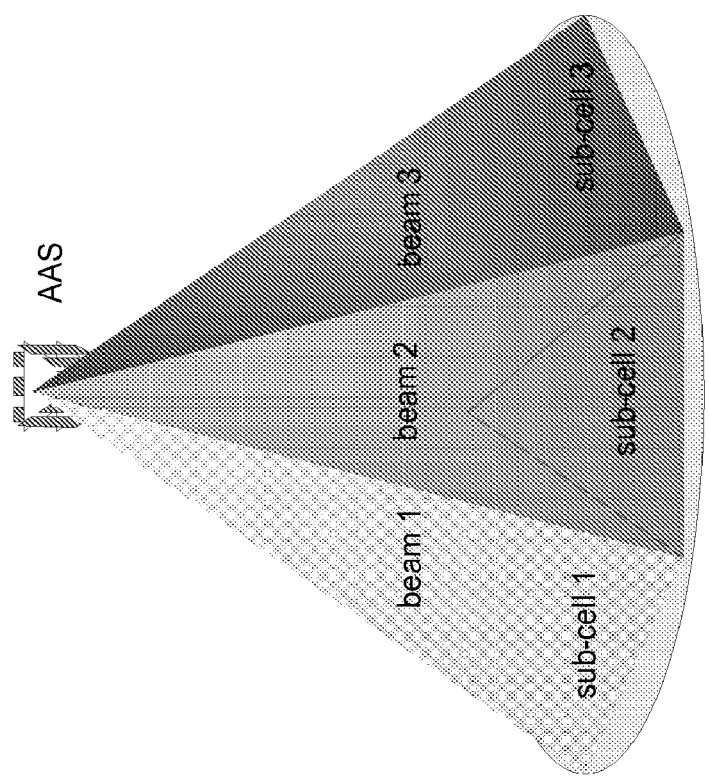
FIG. 7 illustrates an example embodiment of cell partitioning by horizontal beamforming.

Additionally, cell densification may be provided, for example, by partitioning an existing cell into small sub-cells such that narrower beams may be formed by an AAS. By simultaneously emitting or receiving multiple narrow beams from the same AAS or multiple AASs, users in different geographic regions in a cell may be served and/or provided within the same frequency resource, enabling a boost of network capacity from the cell splitting gain. Example embodiments of cell densification may be illustrated in FIG. 6 and FIG. 7 where vertically steered beams (e.g. cell partitioning by vertical beamforming) and horizontally steered beams (e.g. cell partitioning by horizontal beamforming) may be used respectively. As shown in FIGS. 6 and 7, a cell may be split into 3 sub-cells (e.g. sub-cell 1, 2, and 3) by 3 separated beams (e.g. beam 1, 2, and 3). Additionally, such a cell partition may be performed in both a downlink direction and uplink direction via transmission beam forming or receiving beam forming.

In an example embodiment (e.g. a first application embodiment), AAS based cell partitioning may be applied to a homogenous network. Within the existing base station sites already deployed, each macro cell may be further densified with an installation of AAS to facilitate multiple antenna beams simultaneously. Depending on the steering orientation of the beamforming (e.g. vertical and/or horizontal as shown in FIGS. 6 and 7) that may be governed by the AAS geometry, one or more of the sub-cell topologies disclosed herein (e.g. below) may be provided and/or may result therefrom.

Figure 8:
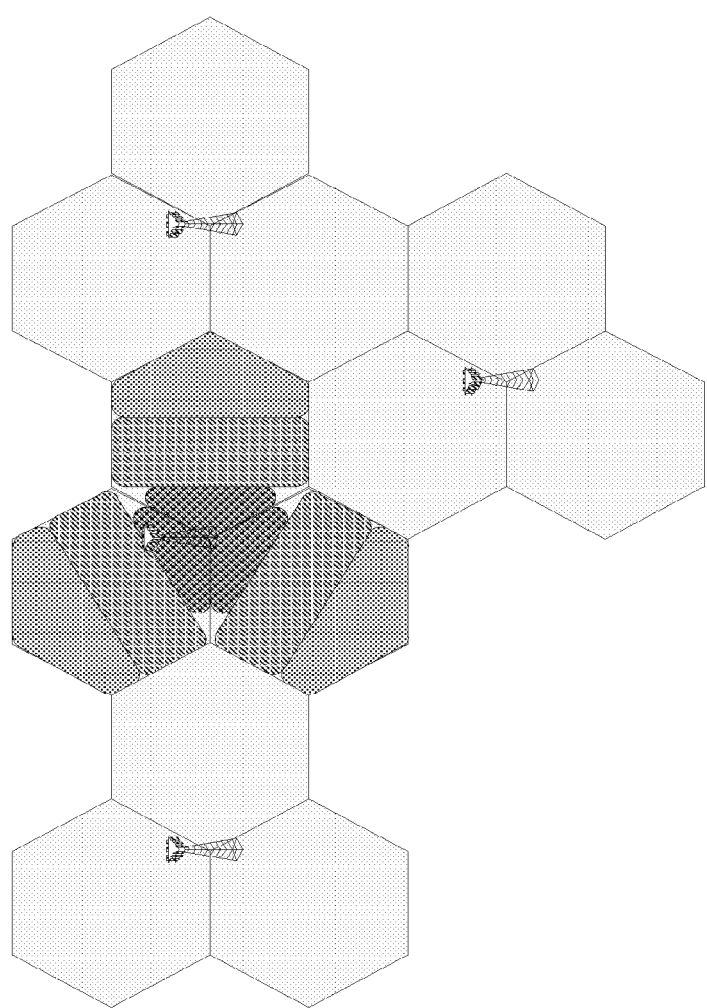
FIG. 8 illustrates an example embodiment of a non-uniform sub-cell topology associated with vertical beamforming.
Figure 9:
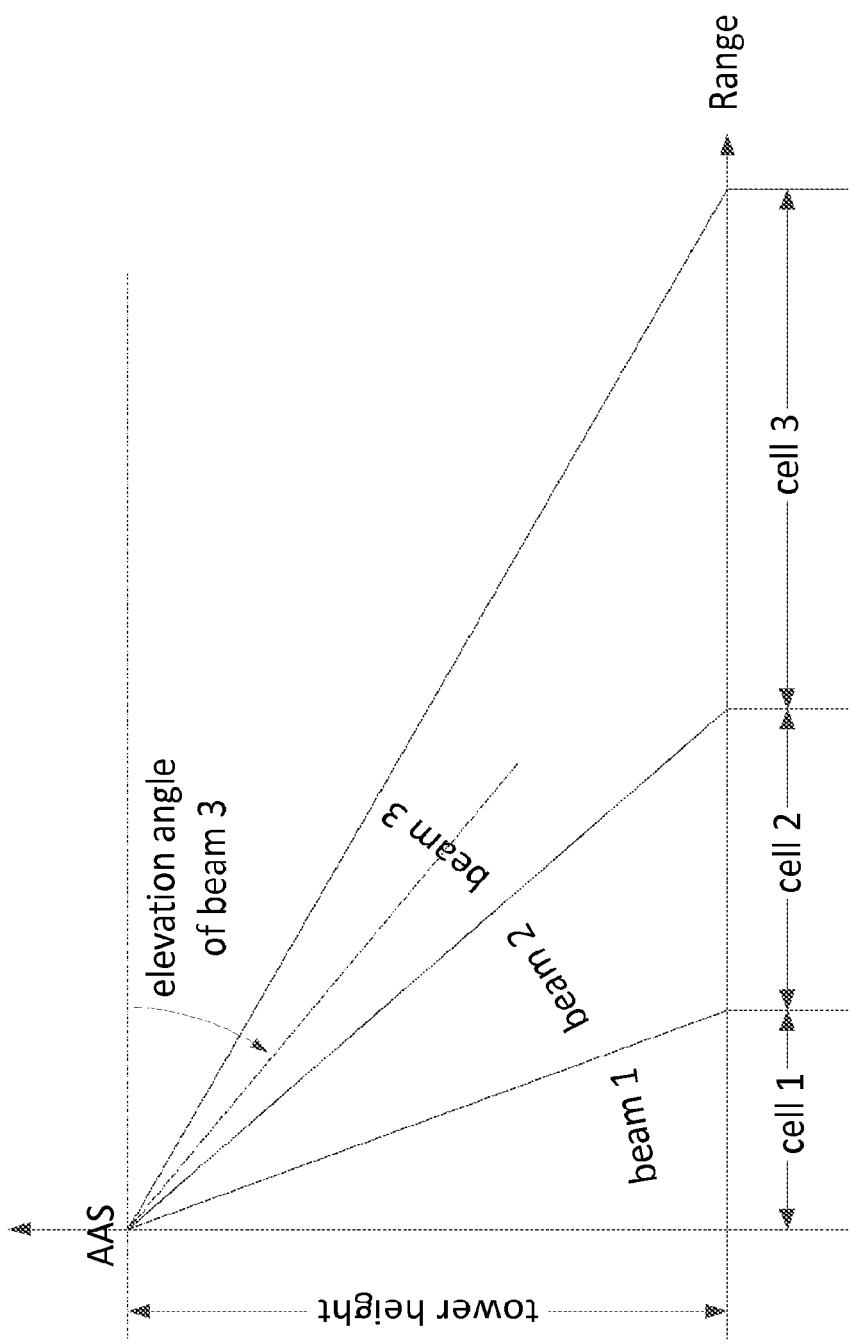
FIG. 9 illustrates an example embodiment of non-uniform cell partition.

For example, a non-uniform cell partition may be provided (e.g. for a sub-cell topology). In such an embodiment, a cell may be split into small sub-cells at different ranges (e.g. from a tower) as shown in the different patterns, shades, and/or colors in FIG. 8, which illustrates an example embodiment of a non-uniform sub-cell topology stemmed from vertical beamforming. As shown in FIG. 8, the beams may be steered in different elevation angles by a vertically installed AAS. The elevation difference of the beams (e.g. due to the height of the tower) may be translated to a range difference for each sub-cell. Additionally, such created smalls may not be uniform given the same beamwidth and, based thereon, the sub-cell sizes may be different as shown FIG. 9, which illustrates an example embodiment of a non-uniform cell partition with different ranges and/or angles based on tower height. As shown in FIG. 9, in an embodiment, cell 3 may have a larger range than, cell 2 and cell 1 based on the same tower height and the different elevation angles associated therewith. Additionally, the signal strengths (e.g. associated with the different beams and cells) may be unequal in such an embodiment based on various pass losses resulted from the range difference (e.g. the range differences between cells 1, 2, and 3 shown in FIG. 9).

According to an embodiment, one or more AAS control parameters for sub-cells (e.g. associated with a non-cell partition of cells 1, 2, and 3) may be configured differently to achieve similar size of coverage with equal user experience in each cell (e.g. to enable the ranges to be similar for cells such as cells 1, 2, and 3). For example, a beamwidth of a smaller elevation angle may be set with a smaller value and the transmit power of a cell associated therewith may be boosted to compensate for a path loss difference. Although deployed in a homogeneous macro cell environment, vertical cell partitioning (e.g. as shown in FIGS. 8 and 9 and described herein) may also provide non-homogeneous micro behavior.

Figure 10:
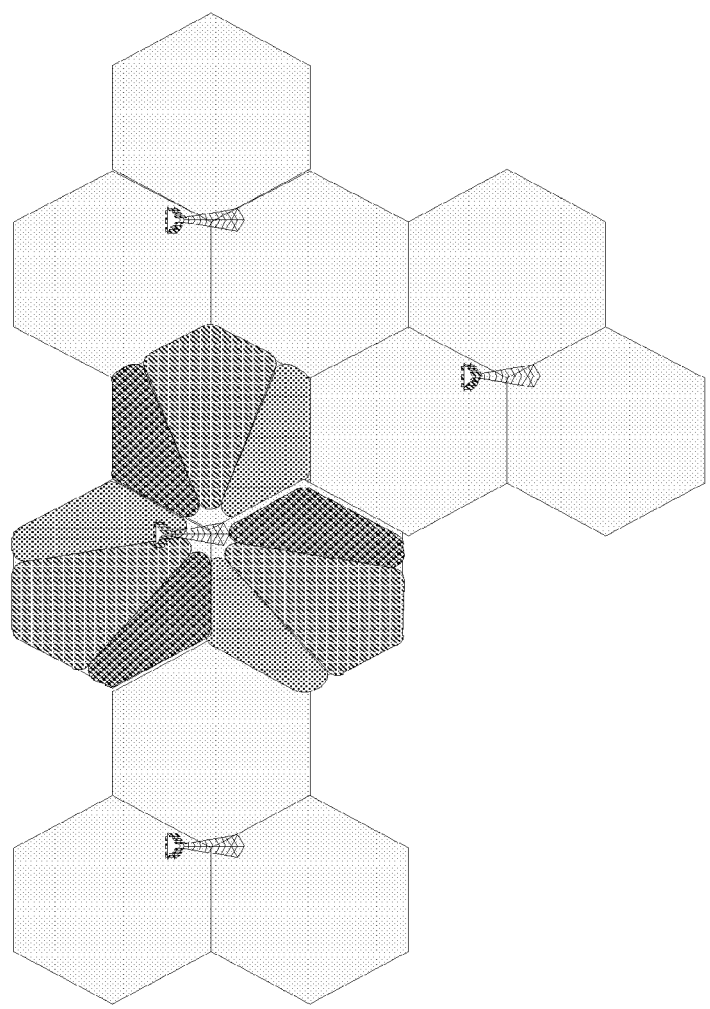
FIG. 10 illustrates an example embodiment of uniform sub-cell partitioning associated with horizontal beamforming.

A uniform cell partition may also be provided (e.g. for a sub-cell topology). In an embodiment of uniform cell partitioning, when a beam steering may be performed in an azimuth direction by a horizontally installed AAS (e.g. as shown in FIG. 10, which illustrates uniform sub-cell partitioning provided by horizontal beamforming), the sub-cells that may be partitioned may be uniform such that an equal beamwidth may create a similar span area for all or some of the sub-cells and each sub-cell may have similar range characteristic. For example, as shown in FIG. 10, span areas (e.g. as shown by the different patterns) may be similar for the sub-cells and/or cells. The range variation in a sub-cell, however, may retain or maintain the same characteristic as the original macro cell. As such, the small cells partitioned in this embodiment may not directly improve the user fairness within a sub-cell. In an example embodiment, such horizontally partitioned sub-cells (e.g. as shown in FIG. 10) may not use and/or need an AAS (e.g. to be elevated in a tower).

Figure 11:
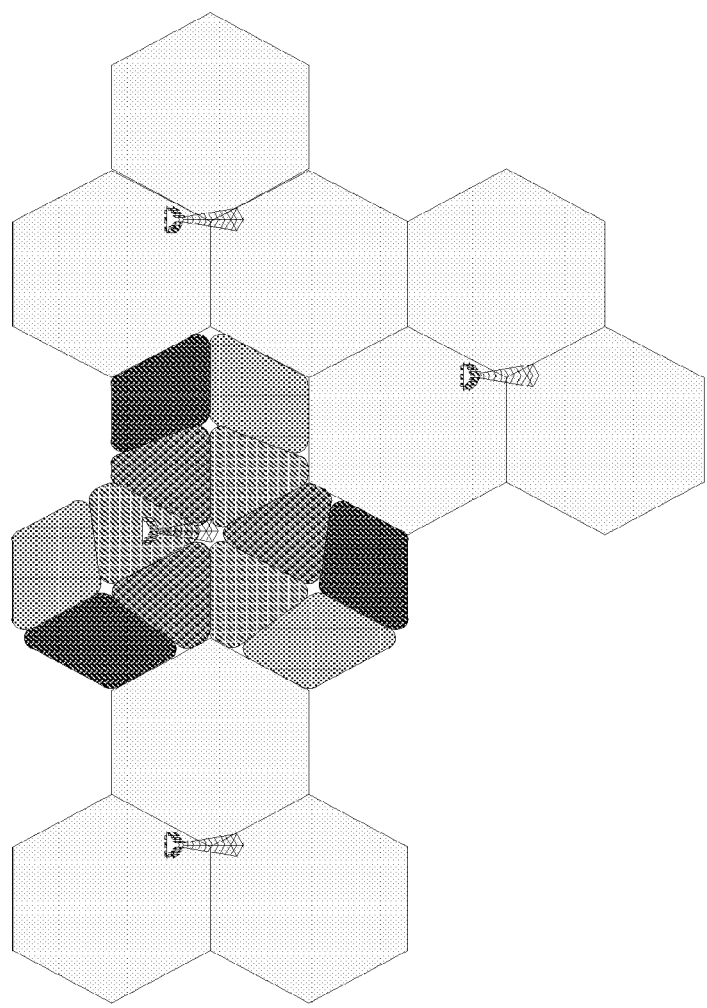
FIG. 11 illustrates an example embodiment of a cell that may partitioned by vertical and horizontal beamforming.

Dense cell partitioning may further be provided (e.g. for a sub-cell topology). For example, densification of a macro cell may use AAS beams tilted in both vertical and horizontal directions (e.g. to provide dense cell partitioning). To be able to steer the antenna beams in both directions, an AAS may be configured into a planary array. FIG. 11 illustrates an example embodiment of dense cell partitioning from both vertical and horizontal beamforming that may use such a planary array. As shown in FIG. 11, a cell such as a macro cell may be split into 4 sub-cells (e.g. shown in the four different patterns).

Figure 12:
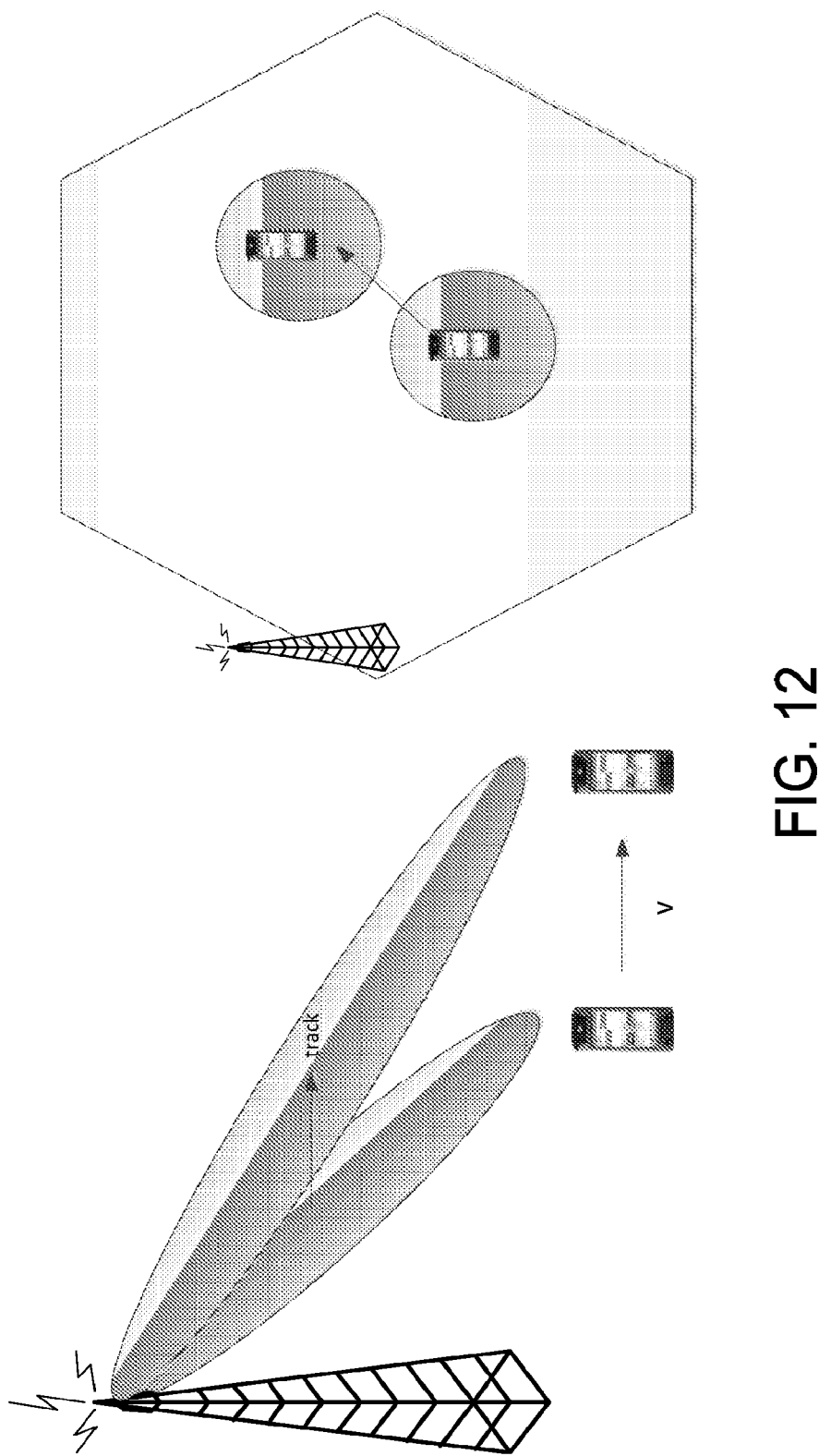
FIG. 12 illustrates an example embodiment of a UE specific sub-cell partitioning.

Additionally, UE-specific sub-cells may be provided (e.g. for a sub-cell topology). In an embodiment for UE-specific sub-cells, no particular cell partitioning may be performed and/or used. In particular, a virtue sub-cell may be formed from an AAS beam that may be associated with a serving UE. This virtue cell may track a UE by dynamically adjusting the steering parameters of the beam as the UE may move. Such a tracking may enable the UE to be positioned at the center of a sub-cell. An example embodiment of a UE-specific sub-cell and the tracking of a virtue cell (e.g. v) thereof may be shown in FIG. 12.

Additionally, multiple users in a cell may be scheduled by multiple UE-specific beams within the same frequency and time resource (e.g. when or if they may be geographically separated). A different set of UEs may further be served in other time resources that may have a different cell configuration such that the cell partitioning thereof (e.g. UE-specific cell partitioning) may be flexible and dynamic. To support dynamic beam steering for UE-specific cell partitioning, a planary array AAS configuration (e.g. as shown in FIG. 11) and beam steering of fine granularity may be used.

Cell densification by the AAS (e.g. AAS-based cell densification) may also be applied to different cell layers in a network such as heterogeneous network (e.g. a network with both smaller cells such as pico-cells, micro-cells, and the like and larger cells such as macro-cells). In particular, AAS devices with low power transmission may be used such that applications may be provided for low power transmission nodes such as micro or pico cells.

Figure 13:
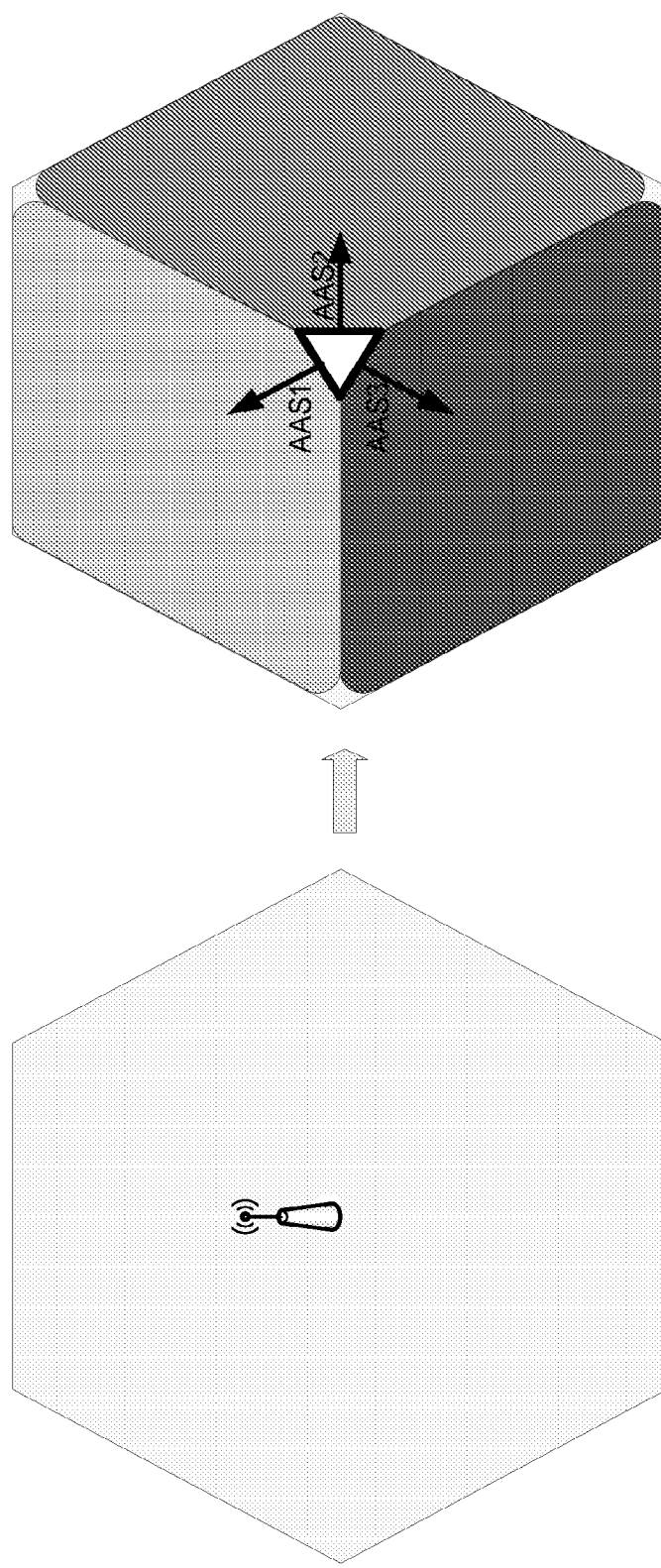
FIG. 13 illustrates an example embodiment of a cell such as a pico cell that may be sectored.

In an embodiment, such an AAS-based cell densification may use an AAS-based cell partition (e.g. that may be applied to small cells such as pico-cells). For example, in current small or pico-cell deployments, an omnidirectional antenna may be used that may create a cell coverage area surrounding the transmission point. Due to the beam steering mechanism of AAS, the small cell such as the pico-cell may be sectored into smaller cells by configuring multiple AAS devices pointing in sectored directions. FIG. 13 illustrates an example embodiment of a sectored small cell such as a pico-cell. As shown in FIG. 13, a pico cell may be divided (e.g. sectored) into 3 sectors where 3 AAS devices (e.g. AAS 1, 2, and 3) may be used to cover 3 different sector directions.

Figure 14:
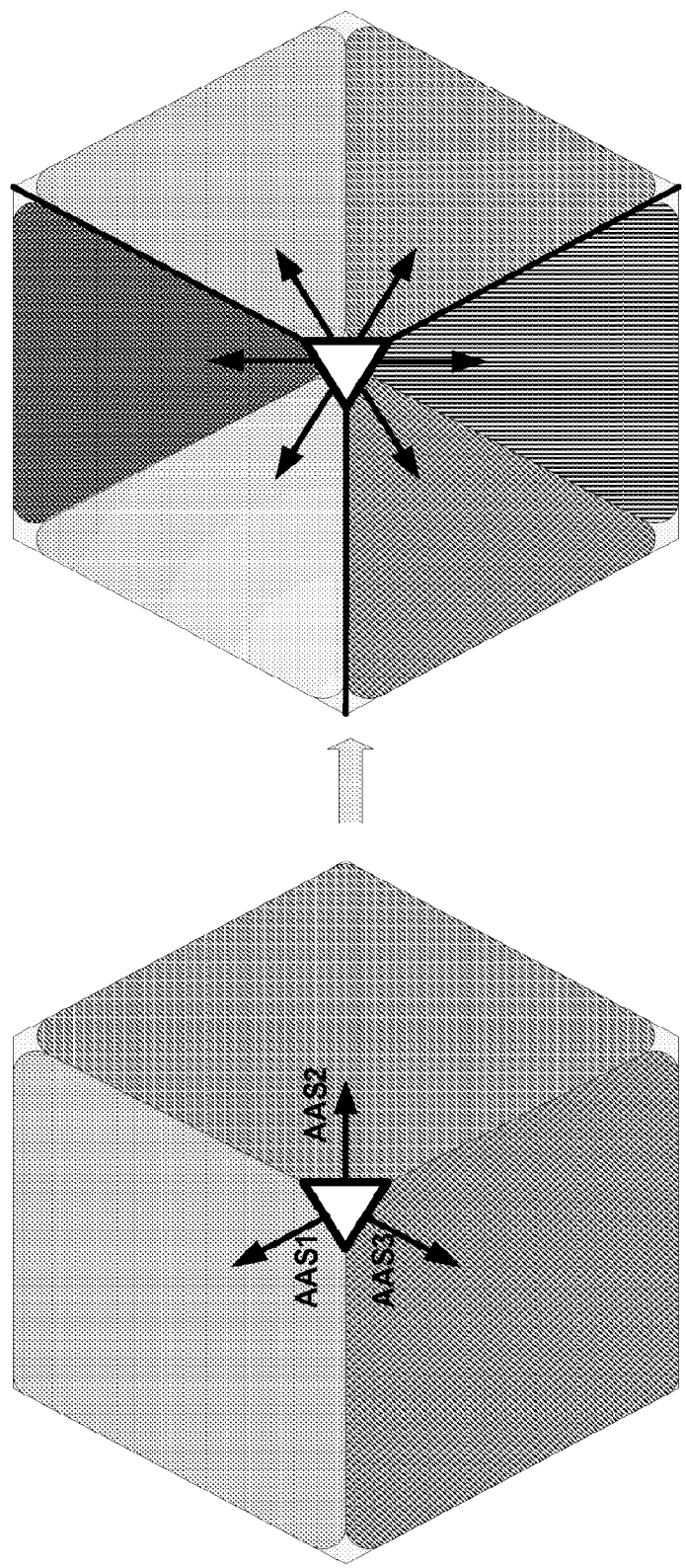
FIG. 14 illustrates an example embodiment of a sectored cell such as a pico cell that may be further partitioned by different beams.

Cell densification may be performed (e.g. after such partitioning) by generating multiple narrow beams for each AAS by horizontal or vertical beamforming. For example, horizontal tilted beams may generate a sub-cell topology as shown in FIG. 14, which illustrates an example embodiment of a sectored pico cell further partitioned by different beams.

Figure 15:
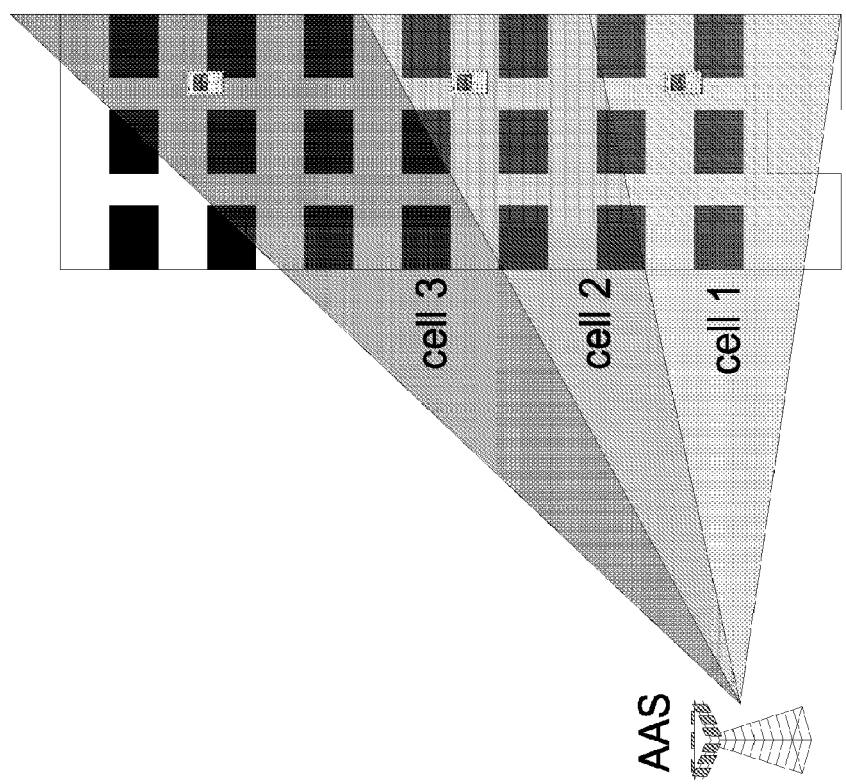
FIG. 15 illustrates an example embodiment of a vertically partitioned cell such as a pico cell.

In embodiments, small cells or pico-cells may not be deployed with high elevation. In this embodiment, vertical beamforming such as that described above in FIGS. 8 and 9 may not be applicable. For urban deployment, however, the cell partitioning using vertical tilted beams may be used in a different manner for high rise buildings. FIG. 15 illustrates an example embodiment of a vertically partitioned small cell or pico-cell that may partitioned with vertical tilted beams.

According to an example embodiment, the AAS based cell partitioning may also be simultaneously applied to both macro and pico-cells in a network such as a heterogeneous network. Such an application to both macro and pico-cells or other small cells in a network may generate or provide a variety of small cell topologies due to the flexibility of the beam tilting control offered by AAS. Additionally, in such an embodiment, a pico cell may be well isolated if the transmission beams of macros cell may be carefully designed to minimize radiation to the pico cell coverage area. For example, by jointly optimizing the tilting angle and beamwidth of the surrounding sub-cells, the macro cell may be portioned such that the small cell or pico-cell coverage may be singled out as a sub-cell isolated from the others. The beam serving this sub-cell that may include the pico serving area may be turned off or dynamically controlled to avoid macro interference to the pico cell. The pico cell may also control its beams in cell partitioning to reduce or avoid interference to the macro cell serving area.

As described herein such small cell implementations or embodiments (e.g. in a 3GPP wireless network) may face technical challenges such as interference, backhaul support, network management and/or capacity, and the like. For example, due to an increase of the number of interferers from the dense neighboring cells in co-channel deployment, SINR distributions in heterogeneous networks may be different from the distribution in macro networks or homogeneous networks such that one or more UEs may face interference conditions. Additionally, small cells deployed (e.g., in large numbers) in different geographic areas may need to be efficiently linked to the core network via backhaul and inter-connection of the small cells may be needed, for example, for interference coordination or mitigation. While high capacity and low latency connections between the cells may be desirable for the application of some advanced transmission technologies such as the Coordinated Multipoint transmission (CoMP), the backhaul for such implementations or embodiments may be complex. Additionally, as the number of cells in a service increases and the topology may be more complex, network management for the network design and cell planning may be needed and the operation of small cells may need to be coordinated and/or collaborated to provide high network capacity under a given power budget.

To help alleviate such technical challenges, as described above, Spatial Almost Blank Subframes (SABS) may be provided including resource partitioning with SABS implemented via beam specific parameters where such an SABS may combine a time domain, frequency domain, and spatial domain. Additionally, signaling of coordinated beam parameters and/or control thereof, a beam specific reference signal for sub-cell identification at a UE, a beam blanking for interference management and/or coordination thereof, and/or UE measurement over blanked beam resources may be provided as described herein.

For example, a cell-specific reference signal for beam-partitioned cells (e.g. via vertical and/or horizontal beamforming as described herein) may be provided. A cell may be partitioned based on various radiation related parameters of the antenna system where such parameters may include one or more of the following: an elevation angle (e.g. a parameter that may be controlled by vertical beamforming and that may steer the beam vertically); an azimuth angle (e.g. a bearing parameter that may be controlled by horizontal beamforming and that may steer the beam horizontally); a beamwidth (e.g. a parameter associated with the range of angle that a beam emits to or receives from where such a parameter may define the coverage area of the sub-cell); polarization (e.g. a parameter associated with the direction of the E-field of the radiated wave); and the like.

Sub-cells in the partitioned cell may operate based on the same set of transmission parameters including, for example, a PCI (physical cell ID), a reference signals, the parameters above, and the like. In such an embodiment, differentiation between different sub-cells may be based upon the radiated beam (e.g. an accurate determination of the radiated beam). For example, each sub-cell may use its own subset of transmission parameters based on the cell ID.

Additionally, the cell-specific reference signals that may be used to coordinate transmissions, measurements, interference, and the like may be transmitted one or more antenna ports such as antenna ports 0 to 3. In an embodiment, the reference-signal sequence $r_{l,n_s}(m)$ that may be used may be defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ may be a slot number within a radio frame and l may be an OFDM symbol number within the slot. The pseudo-random sequence c(i) may be defined by a length-31 Gold sequence with an output sequence c(n) (e.g. where i may be the equivalent of n or a substation for n) and a length $M_{PN}$ where n=0, 1, . . . , $M_{PN}$−1 and $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2.$$

In such an example, $N_C$=1600 and the first m-sequence may be initialized with $x_1(0)$=1, $x_1(n)$=0, n=1, 2, . . . , 30. The initialization of the second m-sequence may be denoted by $c_{init}$. For example, to generate such a sequence, a pseudo-random sequence generator may be initialized with:

$$c_{init}=2^{10} \cdot (7 \cdot (n_s+1)+l+1) \cdot (2 \cdot N_{ID}^{cell}+N_{beam}+1)+2 \cdot (N_{ID}^{cell}+N_{beam})+N_{CP},$$

or $$c_{init}=2^{10} \cdot (7 \cdot (n_s+1)+l+1) \cdot (2 \cdot N_{ID}^{cell}+1)+2 \cdot N_{ID}^{cell}+N_{CP}=N_{beam}$$

at the start of each OFDM symbol where $$N_{CP} = \begin{cases} 1 & \text{for normal } CP \\ 0 & \text{for extended } CP \end{cases}$$

and $N_{beam}$ may be the number of radiated beams provided by the antenna system. The cell-specific frequency shift may remain the same as an un-partitioned cell frequency shift and, in an embodiment, may be defined or determined by $v_{shift}=N_{ID}^{cell} \bmod 6$ or $v_{shift}=(N_{ID}^{cell}+N_{beam}) \bmod 6$.

Additionally, a beam-specific reference signal may be provided. The beam-specific reference signal may be used to assist sub-cell identification and selection. For example, a UE may compare signal strengths (e.g. RSRP) of each beam to determine a sub-cell (e.g. a best sub-cell or a sub-cell with the highest strength of the compared sub-cells. For the purpose of cell identification, a reference signal per beam may be used and such a reference signal may span across an interested frequency band or at least part of it.

Interference control for AAS partitioned small (e.g. pico) cells may be provided as described herein. For example, when UEs may be located in proximity of a border of sub-cells that may be partitioned by different beams, 'beam-edge' users may be created where such users may suffer from a weaker signal and interference that may be caused by beam leakage or the sidelobe of beams.

In an embodiment, the interference control may be provided by coordinated cell partitioning. Such coordinated cell partitioning may mitigate or control inter-beam interference. As described herein, parameters of AAS that may control cell partitioning may include one or more of the following: tilting angles (e.g. elevation and azimuth); beamwidth; nulling direction; beam transmission (TX) power; and the like. Depending on UE channel conditions and a network scheduling decision, these parameters may be dynamically adjusted in a coordinated manner across multiple sub-cells, for example, to minimize inter-beam interference, increase UE throughput, and the like.

Figure 16:
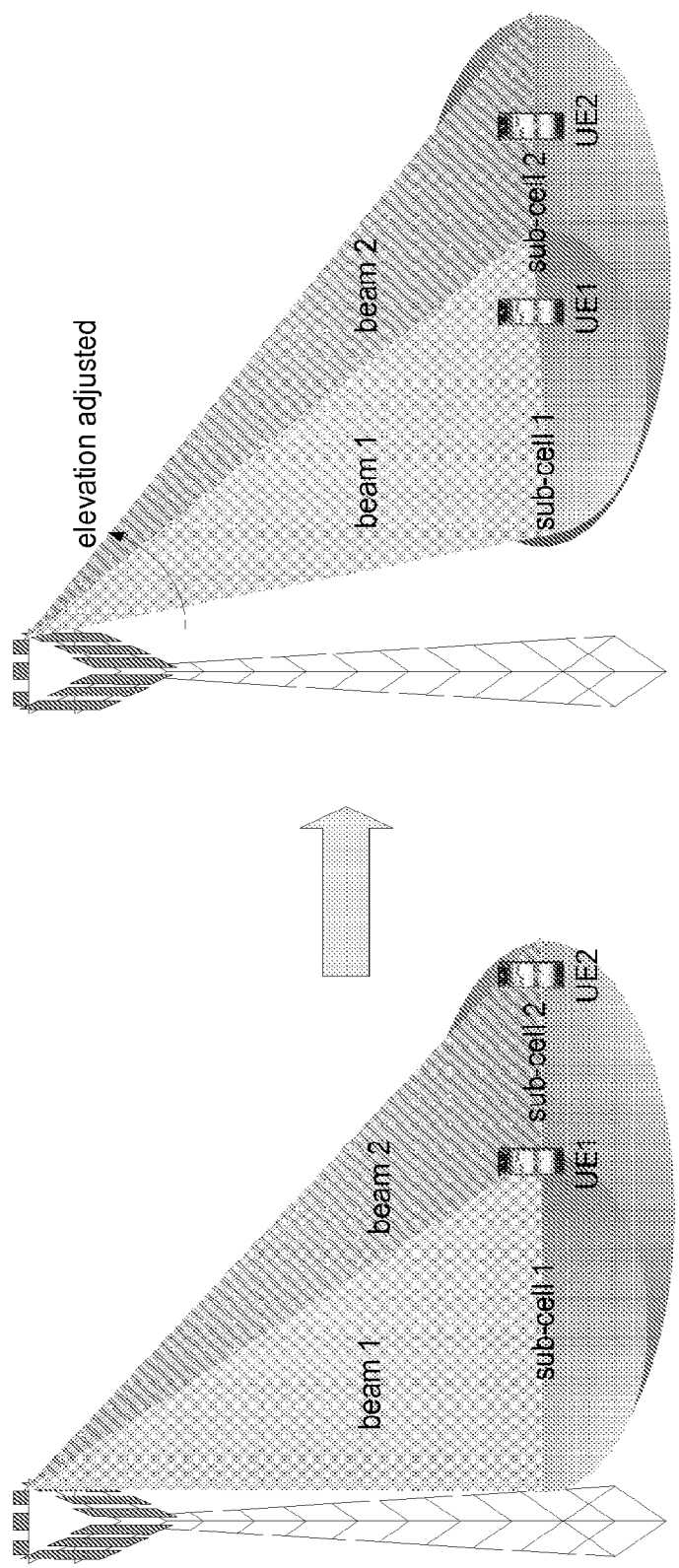
FIG. 16 illustrates an example embodiment of coordinated tilt control.

According to example embodiments, coordinated cell partitioning may include one or more sub-categories that may be applied individually or in any combination. For example, coordinated cell partitioning may include coordinated tilt control. In coordinated tilt control, steering angles of beams associated with multiple sub-cells may be dynamically adjusted in a coordinated manner (e.g. upward, downward, at a particular angle, and the like) to increase signal strength and reduce interference to beam-edge users. As such (e.g. using such a dynamic adjustment in a coordinated manner), cell partitioning may be performed using one transmission point with multiple beams such that sub-cells (e.g. as shown in FIG. 16) may be resized according to the traffic load or other criteria. FIG. 16 illustrates an example embodiment of a coordinated tilt control. As shown in FIG. 16, an elevation angle of the beams of the sub-cells (e.g. sub-cell 1 and 2) may be adjusted outward (e.g. in the direction of the arrow) to improve service associated with the beam-edge UEs (e.g. UE1 and UE2 shown).

Figure 17:
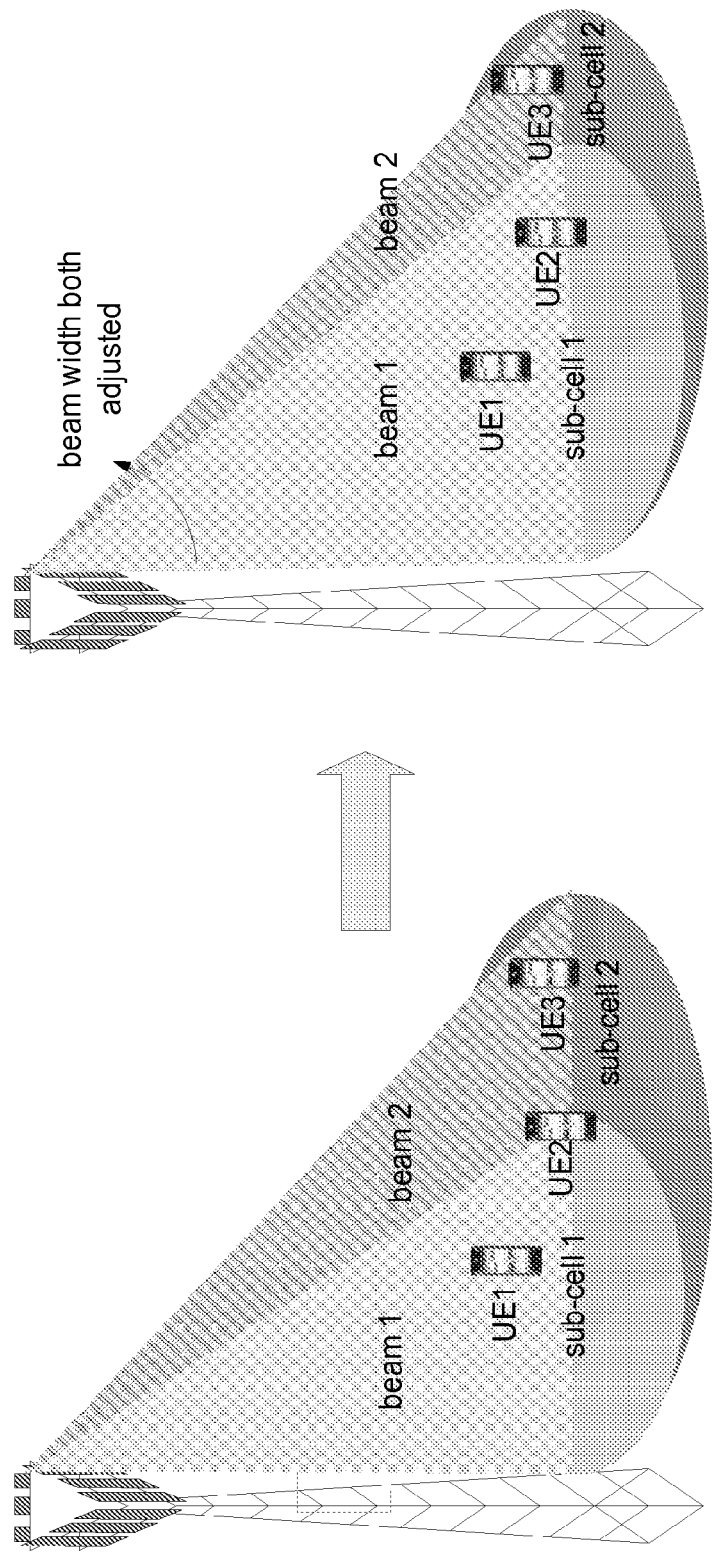
FIG. 17 illustrates an example embodiment of coordinated beamwidth control.

Coordinated cell partitioning may further include coordinated beamwidth control. In coordinated beamwidth control, each beam may have its own beamwidth, for example, to control a coverage area of an associated sub-cell. The beamwidth may be dynamically and coordinately adjusted, for example, by an active antenna subsystem or a bank of passive antenna subsystems that may each have a different radiation beamwidth (e.g. to improve signals and/or to mitigate interference). FIG. 17 shows an example embodiment of coordinated beam width control. As shown in FIG. 17, two UEs (e.g. UE1 and UE2) may be co-scheduled in a sub-cell (e.g. sub-cell 1) and one UE (e.g. UE3) may be scheduled in another sub-cell (e.g. sub-cell 2). The beamwidth for each sub-cell may be adjusted as shown in FIG. 17 (e.g. outwardly increased) such that the UE at the beam edge (e.g. UE2) in the sub-cell (e.g. sub-cell 1) may not be at a beam edge of the sub-cell after adjustment. Coordinated beamwidth control may also be used for cell data offloading. For example, a narrow beam may be applied in a geographic area with additional users such that a smaller sub-cell may be formed, for example, to take advantage of a cell splitting gain. Other areas with sparse users may be associated with a large beamwidth to cover a larger area. When user distribution changes during the day, the cell topology may be adapted to user needs and/or requests.

Figure 18:
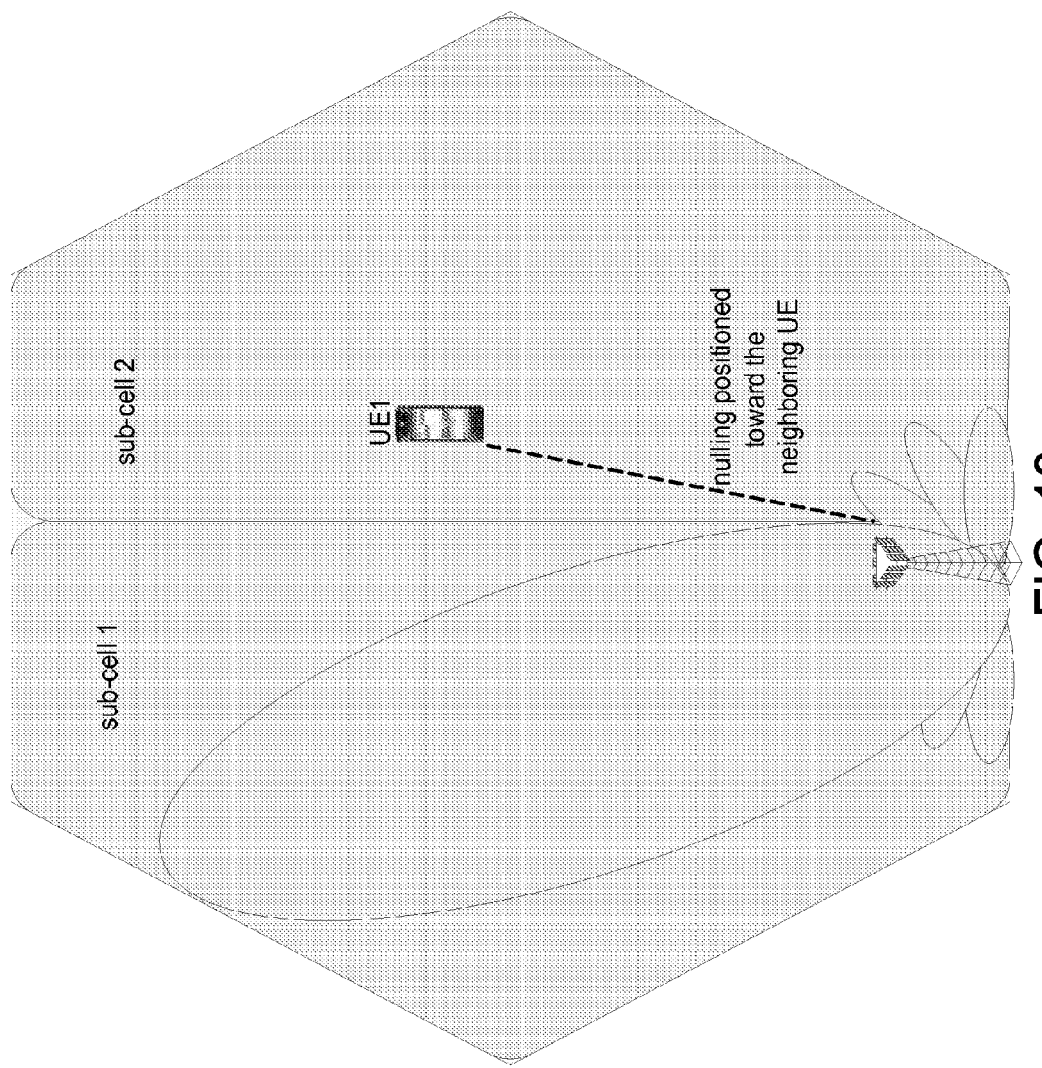
FIG. 18 illustrates an example embodiment of coordinated nulling positioning.

Coordinated cell partitioning may further include coordinated nulling positioning. In coordinated nulling positioning, a nulling location (e.g. that may be an angle that may result in a zero transmission as shown in FIG. 18) in a beam may be made tunable by controlling the phase and amplitude of each antenna element of an AAS. When a beam-edge UE in a neighboring cell may be scheduled, the nulling location may be coordinately positioned toward the direction of the UE, or the tilting direction of the sub-cell serving the UE such that the interference level may be reduced from the nulling changes. FIG. 18 illustrates an example embodiment of coordinated nulling positioning. As shown in FIG. 18, the signal transmitted for sub-cell 1 may not cause interference on UE1 (e.g. in sub-cell 2) that may be sitting on the null angle of the shown radiation pattern. Additionally, as shown in FIG. 18, the nulling location may be moved directed toward a neighboring UE (e.g. UE 1) or toward the sub-cell with the UE therein.

In another example embodiment, coordinated cell partitioning may include coordinated power control. In coordinated power control, the power of each sub-cell may be dynamically and coordinately controlled (e.g. the power may be increased and/or decreased to adjust the coverage of each beam). For example, a transmit power may be determined for a sub-cell based different criteria such as an expectation of traffic load in a given sub-cell, a level of interference in a sub-cell (e.g. a different sub-cell than the UE may be associated with), and the like. When determining the transmit power for a sub-cell, the sub-cell may select or determine a power that may maximize the performance of its own severing UEs, that may minimize the interference to the UEs in the neighboring sub-cells, and the like. In example embodiments, such information (e.g. the power that may maximize performance or may minimize interference) may be determined by measuring and/or reporting a level of signal interest and interference (e.g. by UEs in different sub-cells) to their corresponding sub-cell eNB. The measurements may be based on CRS or other reference signals such as CSI-RS.

In embodiments, signaling may be used as described herein for such coordinated cell partition. For example, to facilitate the coordinated cell partitioning in a heterogeneous network when multiple cell layers may overlap, the set of beam parameters described in the embodiments herein may be exchanged among the macro and small cells or pico cells whereas in a homogeneous deployment, each base station may configure its beam parameters autonomously. Such information (e.g. the beam parameters) may be communicated among the neighboring macro cells and/or small or pico-cells to improve interference management (e.g. for cell edge users). In embodiments, such an information exchange may occur using an X2 interface on which beam parameters semi-statistically configured by one base station may be indicated to its neighboring base stations.

For example, for each of the beam parameters (e.g. tilting angle, beamwidth, nulling direction, beam transmit power, and the like), a bitmap may be defined as described herein (e.g. such parameters may be provided as bits in a bitmap) and may be between eNBs providing the cells or sub-cells over the X2 interface. In an embodiment, for a tilting angle, each bit of the indicator (e.g. of the bitmap or included in the bitmap) may correspond to a range of tilting angles that may be defined over an interval with some minimum and maximum values that may be used for coordinated partitioning. Additionally, bits in the bitmap associated with a beamwidth indicator may correspond to a set of predefined angular separations between points (e.g. two points) on an antenna radiation pattern that may be used for coordinated partitioning. In case of beam transmit power, a bit map may be defined to indicate to the neighboring cells the maximum beam transmission power that the eNB intends to employ in the near future. The neighboring cells may utilize this information to limit the interference impact on their serving UEs (e.g. when coordinating partitioning). Additionally, each of these parameters may be configured over time (e.g. a set of subframes) or in frequency (e.g. one or multiple resource blocks). To support such functionality, a bitmap (e.g. an extra bitmap) corresponding to the set of subframes or resource blocks (RBs) over which this configuration may be valid may be signaled over the X2 interface. Similar interface messages may be provided in an RRC protocol, for example, to get the UE better informed about the sub-cell deployment. The beam configuration information may be used to assist UE reception (e.g. via interference-aware advanced receivers) in one or more of the cells and/or sub-cells that may be portioned and coordinated.

In embodiments, interference in networks described herein may further be controlled by resource partitioning. For example, resource partitioning may be provided and/or performed via beam blanking. In beam blanking, network resources may be partitioned among co-channel deployed sub-cells, for example, to control or mitigate the interference. If one or more of the sub-cells may cause interference to each other for their serving UEs, for example, at a beam edge, the scheduling resource may be shared in time among these sub-cells. Additionally, some (e.g. one or more) of the beams may be intentionally 'blanked' for a certain amount of time to reduce the interference to the UEs served by the other sub-cells.

To 'blank' a beam (e.g. provide a 'blank' operation) one or more of the following may be performed. For example, in one embodiment, the entire transmission of a sub-cell, or an AAS beam, may be stopped in the blank period.

Additionally, during a blank period, no data channels may be scheduled in a beam that may be serving a particular sub-cell. To support a network operation, however, some of the control channels may be allowed to transmit in the blank period. For example, transmission of some control channels designed for UE measurement and synchronization may be allowed. A beam under such control may be referred to as 'almost blanked beam' (ABB).

In an additional example embodiment, during the blank period, the data channels may be transmitted with lower power in a beam. Other controlled channels in the same beam may be transmitted with full power. A beam under such configuration may be further referred to as non-zero-power ABB. As such, in embodiments, the control channels, or a subset thereof, may be transmitted with reduced power.

In beam blanking, frequency resources may also be shared among the sub-cells and/or the beams. For example, beam blanking (e.g. in the beam blanking operation or method) may use a part of a frequency band for one set of sub-cells and another part of the frequency band for another set of sub-cells. The frequency resource partitioning may be specified in terms of sub-carriers, resource blocks, or component carriers (CA), for example, for a wireless network such as an LTE based wireless network. The beam blanking may also be applied over a set of subframes in time (e.g. may be limited to being applied over a set of subframes in time).

According to an example embodiment, beam blanking may be applied when, for example, a beam (e.g. one beam) from the AAS may be used to serve an entire cell associated therewith. For example, depending on the UE location and radio channel condition, the AAS may explore the spatial property of the serving UE and may steer this beam to different directions by controlling its tilting angles, for example, for improved or optimal transmission. In such an embodiment, inference may be controlled or reduced by not allowing the AAS beam to be transmitted in a particular spatial direction during a blank period. By doing this, the cell edge UE served by another cell near this direction may be protected from the interference. The blank period for such configuration of the AAS transmission, in terms of the subframes, may be 'Spatial Almost Blank Subframes' (SABS) in which resource partitioning may be achieved spatially from use of the AAS. According to example embodiments, the SABS may be specified by a set of AAS parameters such as azimuth or elevation angles.

Figure 19:
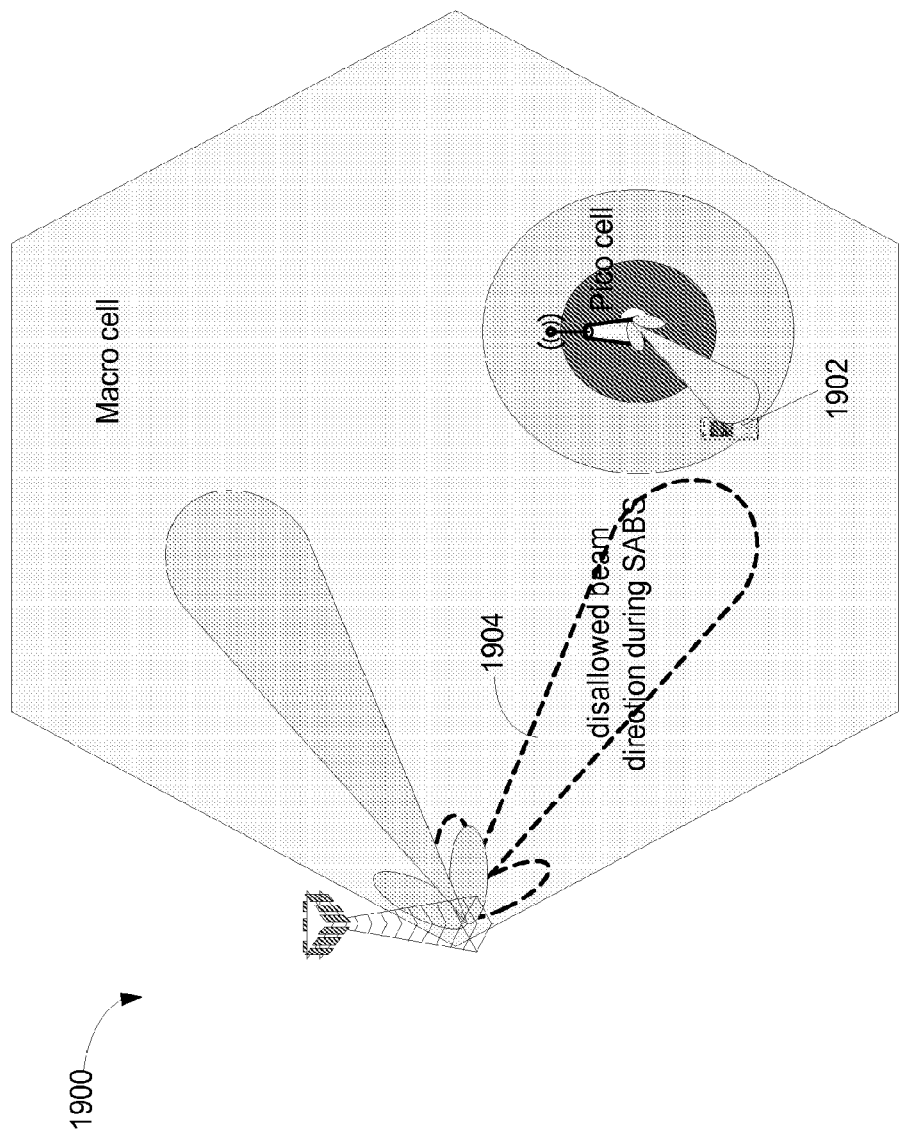
FIG. 19 illustrates an example embodiment of an application of SABS.

FIG. 19 illustrates an example embodiment of SABS. AS shown in FIG. 19, SABAS may be applied in a heterogeneous network (e.g. a HetNet 1900) with a macro and pico-cell. In such an embodiment, a cell-edge UE (e.g. 1902) that may be served by the Pico cell may be protected by SABS over which the macro cell may not be allowed to transmit in a direction towards the UE (e.g. via 1904).

Figure 20:
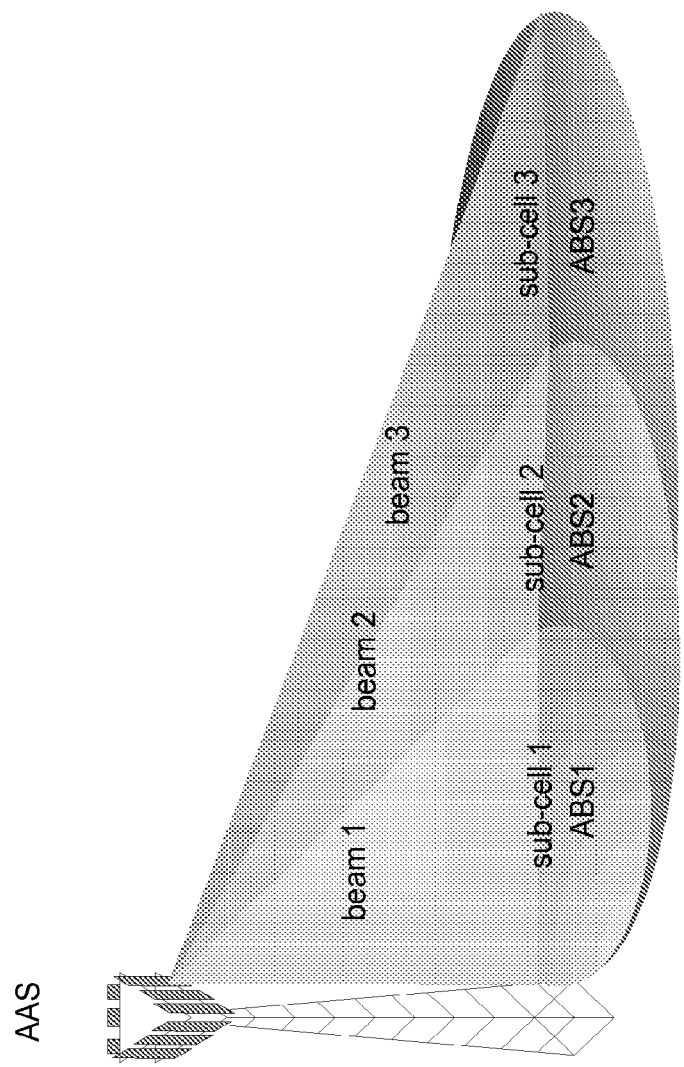
FIG. 20 illustrates an example embodiment of SABS using vertical beamforming in a system.

SABS may also be used in a multi-beam homogeneous system. FIG. 20 shows an example embodiment of SABS in a multi-beam homogenous system using, for example, using vertical beam forming although other forms of multi-beam systems may be provided. In such an embodiment (e.g. or system configuration), each beam (e.g. beam 1, 2, and 3) may be set to a different ABS pattern (e.g. ABS 1, 2, and 3 as shown). The ABS patterns assigned to each beam may be a subset of each other. Control and broadcast information for a channel may also be transmitted by each available beam while the data channel transmission may follow the ABS pattern defined for a given beam. Additionally, the ABS pattern for each beam may be defined independently based on the offloading capability of each region covered by the beam.

UE measurements may also be provided and/or used for beam blanking. For example, in a communication system (e.g. an LTE system), some of the measurements that may be performed by the UE may be affected by the introduction of beam blanking. As such, one ore of the following may be performed to provide UE measurements with beam blanking.

For example, a UE may be limited to performing Radio Link Monitoring (RLM) measurements on the resources that are configured with beam blanking. For example, when the UE may be configured with Spatial Almost Blank subframes (SABS), the UE may limit its downlink radio link quality monitoring operation or measurements to the SABS or a subset thereof. Additionally, in an embodiment, a UE may be limited to performing Reference Signal Received Quality (RSRQ) measurements (e.g. that may be part of a Radio Resource Management (RRM) procedure) on a limited set of subframes indicated to the UE via higher layer signaling (e.g. SABS). Such a RSRQ measurement restriction may avoid unnecessary intra-frequency cell reselection by the UE during an idle mode of operation. A UE may be limited to performing Channel State Information (CSI) measurements on restricted resources such as a subset of Spatial Almost Blank subframes. For example, the UE may be configured to provide multiple Channel Quality Indication (CQI) reports where each CQI report may correspond to a different beam blanking configuration and/or pattern. In such measurements for beam blanking, the UE may use the same SABS pattern for the measurements or may perform various measurements based on different SABS patterns, for example, depending on the amount of interference that the UE may be experiencing and/or the network load.

Beam blanking coordination may also be provided and/or used as described herein. For example, in either a heterogeneous or homogeneous network, beam blanking (e.g. the beam blanking operation or method) may need close coordination among the multiple beams of multiple transmission points (e.g. to help with interference mitigation). A beam blanking pattern or a set of blanking patterns may be defined that specifies the timing instances of, for example, when and what types of the blank should occur for coordination. For example, based thereon, the beam blanking pattern may comprise one or more of the following parameters: an indication or parameter indicating when a beam blank may occur (e.g. a bit pattern that may include which subframe may be blanked; for each occurrence of beam blanking, an indication or a parameter illustrating tilting angles of the blanked beams (e.g. if the AAS may be limited to performing 2D beamforming, one tilting angle such as azimuth or elevation may be specified); for each occurrence of beam blanking (e.g. and if it may be a non-zero power operation), an indication of the transmit power of the blanked beams; for each occurrence of the beam blanking (e.g. and if it may be a non-zero power operation), an indication of the beamwidth of the blanked beams may be indicated; and the like.

According to an embodiment, the beam blanking may be operated periodically in terms of a beam blanking pattern of certain length such that the beam blanking patterns may be reused for each period. Additionally, a beam blanking pattern may be applied on an irregular basis when a criteria or certain condition such as the amount of interference that the UE may be experiencing and/or the network load may be triggered. The beam blanking patterns for each transmission point may also be generally different such that the patterns may be (e.g. may need to be) exchanged among the cooperating transmission points. A reception point may also be notified about the blanking pattern, for example, for measurement (e.g. correct measurement).

Coordination of the beam blanking may also be performed statically or semi-statically. If the coordination may be performed in a static manner, the beam blanking patterns may be preset among the base stations at an initial cell planning and a UE may be notified via an initial RRC configuration. If a semi-static coordination may be used, the beam blanking pattern may vary over time. As such, a signaling procedure may be used and/or provided over a network interface that may carry the beam blanking patterns of multiple parameters. In such an embodiment, a change of blanking operation may be slow in semi-static coordination. As such, latency requirements on delivering the message from the interface may not be strict and the X2 interface may be used to deliver such a message that may include the beam blanking patterns. For dynamic beam blanking over which the coordination may happen on a per frame basis, a periodic beam blanking pattern may not be used. In such an embodiment, a dynamic order of blanking a particular subframe may be issued via a fast interface with low latency such as a fiber optic based link or a direct link over the air on a L1 interface.

Although the terms UE or WTRU may be used herein, it may and should be understood that the use of such terms may be used interchangeably and, as such, may not be distinguishable.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit and receive unit (WTRU) comprising:
   a receiver configured to receive a cell-specific reference signal;
   a processor configured to:
      select, based on the received cell-specific reference signal, a sub-cell of a base station for communication therewith;
      conduct a measurement on a spatial almost blank subframe (SABS) associated with a blanked beam of the selected sub-cell; and
   a transmitter configured to transmit the measurement to the base station.

2. The WTRU of claim 1, wherein the measurement comprises at least one of the following: a radio link monitoring (RLM) measurement, a reference signal received quality (RSRQ) measurement, or channel state information (CSI) measurements.

3. The WTRU of claim 1, wherein the cell-specific reference signal is associated with a partitioned cell or the sub-cell, wherein the partitioned cell or the sub-cell is associated with one or more parameters.

4. The WTRU of claim 3, wherein the one or more of the parameters comprise radiation related parameters.

5. The WTRU of claim 4, wherein the one or more of the parameters comprise at least one of the following: a tilting angle, a beamwidth, a nulling direction, or a beam transmit power.

6. The WTRU of claim 4, wherein the radiation related parameters include one or more of the following: an elevation angle, an azimuth angle, or a polarization.

7. A method comprising:
   a wireless transmit and receive unit (WTRU) receiving a cell-specific reference signal;
   the WTRU selecting, based on the received cell-specific reference signal, a sub-cell of a base station for communication therewith;
   the WTRU conducting a measurement on a spatial almost blank subframe (SABS) associated with a blanked beam of the selected sub-cell; and
   the WTRU transmitting the measurement to the base station.

8. The method of claim 7, wherein the measurement comprises at least one of the following: a radio link monitoring (RLM) measurement, a reference signal received quality (RSRQ) measurement, or channel state information (CSI) measurements.

9. The method of claim 7, wherein the cell-specific reference signal is associated with a partitioned cell or the sub-cell, wherein the partitioned cell or the sub-cell is associated with one or more parameters.

10. The method of claim 9, wherein the one or more of the parameters comprise radiation related parameters.

11. The method of claim 10, wherein the one or more of the parameters comprise at least one of the following: a tilting angle, a beamwidth, a nulling direction, or a beam transmit power.

12. The method of claim 10, wherein the radiation related parameters include one or more of the following: an elevation angle, an azimuth angle, or a polarization.

* * * * *

UNITED STATES PATENT AND TRADEMARK OFFICE
CERTIFICATE OF CORRECTION

PATENT NO. : 9,831,992 B2  
APPLICATION NO. : 14/995721  
DATED : November 28, 2017  
INVENTOR(S) : Afshin Haghighat et al.

Page 1 of 2

It is certified that error appears in the above-identified patent and that said Letters Patent is hereby corrected as shown below:

On the Title Page

In the Drawing  
Replace each occurrence of reference numeral "116" with --115/116/117--; and  
Replace each occurrence of reference numeral "104" with --103/104/105--; and  
Replace each occurrence of reference numeral "106" with --106/107/109--.

In the Drawings

Sheet 1, FIG. 1A:  
Replace each occurrence of reference numeral "116" with --115/116/117--; and  
Replace each occurrence of reference numeral "104" with --103/104/105--; and  
Replace each occurrence of reference numeral "106" with --106/107/109--.

Sheet 2, FIG. 1B:  
Replace each occurrence of reference numeral "116" with --115/116/117--.

Sheet 3, FIG. 1C:  
Replace each occurrence of reference numeral "104" with --103--; and  
Replace each occurrence of reference numeral "116" with --115--.

Sheet 4, FIG. 1D:  
Replace each occurrence of reference numeral "140a" with --160a--; and  
Replace each occurrence of reference numeral "140b" with --160b--; and  
Replace each occurrence of reference numeral "140c" with --160c--; and  
Replace each occurrence of reference numeral "142" with --162--; and  
Replace each occurrence of reference numeral "144" with --164--; and  
Replace each occurrence of reference numeral "106" with --107--; and  
Replace each occurrence of reference numeral "146" with --166--.

Signed and Sealed this  
Twenty-third Day of April, 2019

Andrei Iancu  
*Director of the United States Patent and Trademark Office*

CERTIFICATE OF CORRECTION (continued)
U.S. Pat. No. 9,831,992 B2

Sheet 5, FIG. 1E:
Replace each occurrence of reference numeral "116" with --117--; and
Replace each occurrence of reference numeral "140a" with --180a--; and
Replace each occurrence of reference numeral "140b" with --180b--; and
Replace each occurrence of reference numeral "140c" with --180c--; and
Replace each occurrence of reference numeral "104" with --105--; and
Replace each occurrence of reference numeral "142" with --182--; and
Replace each occurrence of reference numeral "106" with --109--; and
Replace each occurrence of reference numeral "146" with --186--; and
Replace each occurrence of reference numeral "144" with --184--; and
Replace each occurrence of reference numeral "148" with --188--.